(12) United States Patent
Yamaguchi

(10) Patent No.: US 7,136,708 B2
(45) Date of Patent: Nov. 14, 2006

(54) CONTROL SYSTEM, CONTROL APPARATUS, AND CONTROL METHOD FOR MICROSCOPE STAGE

(75) Inventor: Katsuyoshi Yamaguchi, Tokyo (JP)

(73) Assignee: Olympus Corporation, Tokyo (JP)

( * ) Notice: Subject to any disclaimer, the term of this patent is extended or adjusted under 35 U.S.C. 154(b) by 168 days.

(21) Appl. No.: 10/939,311

(22) Filed: Sep. 9, 2004

(65) Prior Publication Data
US 2005/0063052 A1    Mar. 24, 2005

(30) Foreign Application Priority Data
Sep. 19, 2003    (JP)    ............. 2003-329150

(51) Int. Cl.
    G05B 19/18    (2006.01)
    G06F 19/00    (2006.01)
    G02B 21/26    (2006.01)
(52) U.S. Cl. ............... 700/64; 700/60; 700/193; 359/392; 359/393
(58) Field of Classification Search ............. 700/56, 700/60, 61, 63, 64, 186, 193; 359/368, 383, 359/391–393, 398, 358; 250/440.11, 442.11; 350/507, 528, 530–532, 321
See application file for complete search history.

(56) References Cited

U.S. PATENT DOCUMENTS

| | | | |
|---|---|---|---|
| 4,824,229 A | | 4/1989 | Narita et al. |
| 4,910,679 A | * | 3/1990 | Takahashi et al. ............ 716/21 |
| 5,012,092 A | * | 4/1991 | Kobayashi et al. ......... 250/311 |
| 5,103,338 A | | 4/1992 | Crowley et al. |
| 5,171,963 A | * | 12/1992 | Saruta et al. .......... 219/121.69 |
| 5,459,384 A | | 10/1995 | Engelse et al. |
| 5,557,456 A | | 9/1996 | Garner et al. |
| 5,641,897 A | * | 6/1997 | Schuman ..................... 73/105 |
| 5,780,853 A | * | 7/1998 | Mori et al. ................. 250/310 |
| 5,828,198 A | | 10/1998 | Engelse et al. |
| 5,892,680 A | * | 4/1999 | Kita et al. .................. 700/162 |
| 5,900,708 A | | 5/1999 | Den Enelse et al. |
| 6,006,140 A | | 12/1999 | Carter |
| 6,476,388 B1 | * | 11/2002 | Nakagaki et al. ........... 250/310 |
| 2003/0011883 A1 | | 1/2003 | Ogihara |
| 2003/0142313 A1 | * | 7/2003 | Katayama .................... 356/399 |
| 2006/0076508 A1 | * | 4/2006 | Nakasugi et al. ........ 250/491.1 |

FOREIGN PATENT DOCUMENTS

| | | |
|---|---|---|
| EP | 0 731 371 A1 | 9/1996 |
| JP | 7-272660 A | 10/1995 |
| JP | 9-120031 A | 5/1997 |

* cited by examiner

Primary Examiner—Crystal J. Barnes
(74) Attorney, Agent, or Firm—Frishauf, Holtz, Goodman & Chick, P.C.

(57) ABSTRACT

A control system of a stage of a microscope includes: a stage transfer unit for transferring the stage for loading a sample perpendicular to an optical axis of the microscope; a transfer command acquisition unit for obtaining command information for a transfer of the stage; a stop position direction storage unit for storing stop position direction information which is information generated according to the command information obtained from the transfer command acquisition unit, and the information about a position and direction when an operation of the stage transfer unit is stopped; and a stage transfer control unit for controlling an operation of stage transfer unit according to the stop position direction information stored in the stop position direction storage unit.

20 Claims, 33 Drawing Sheets

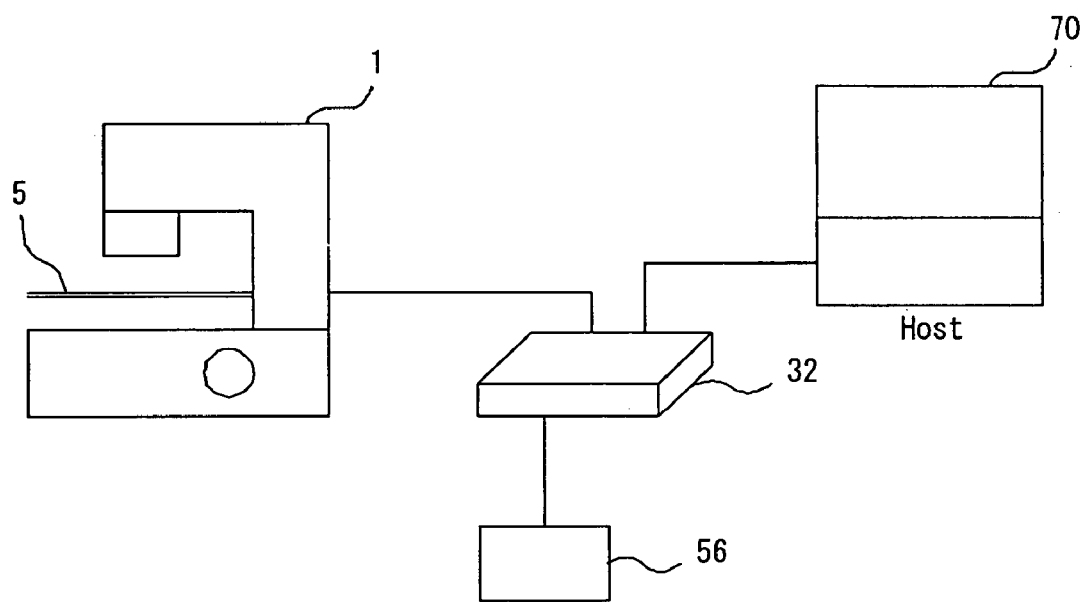
F I G. 1

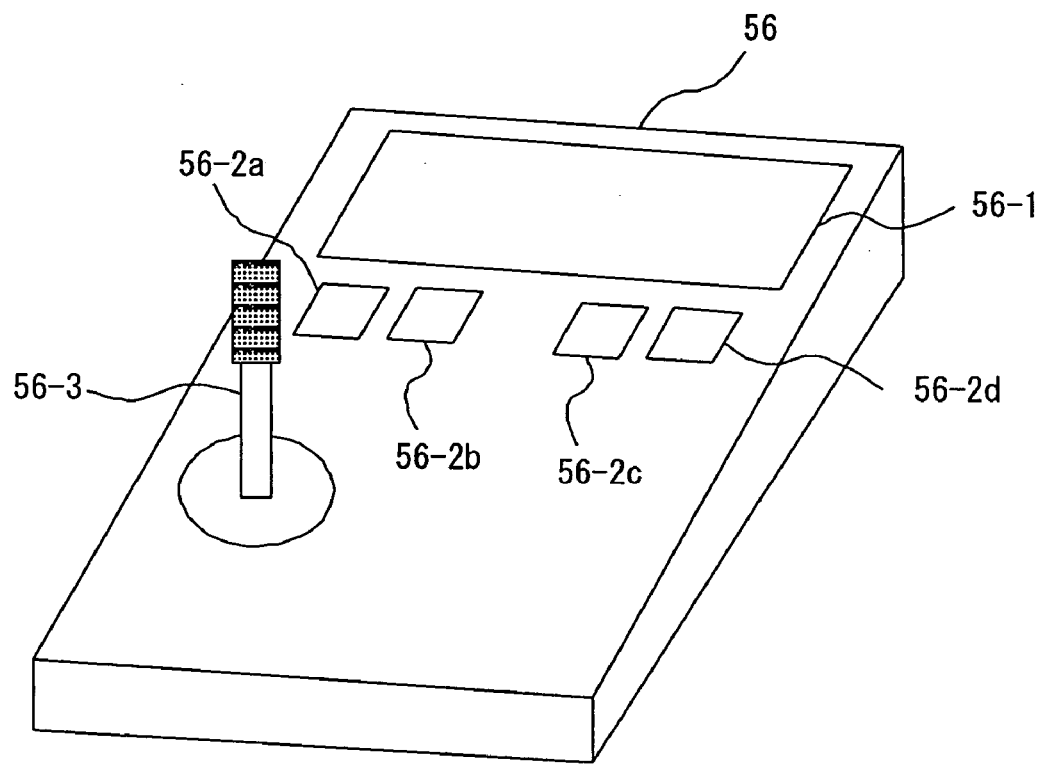
F I G. 6

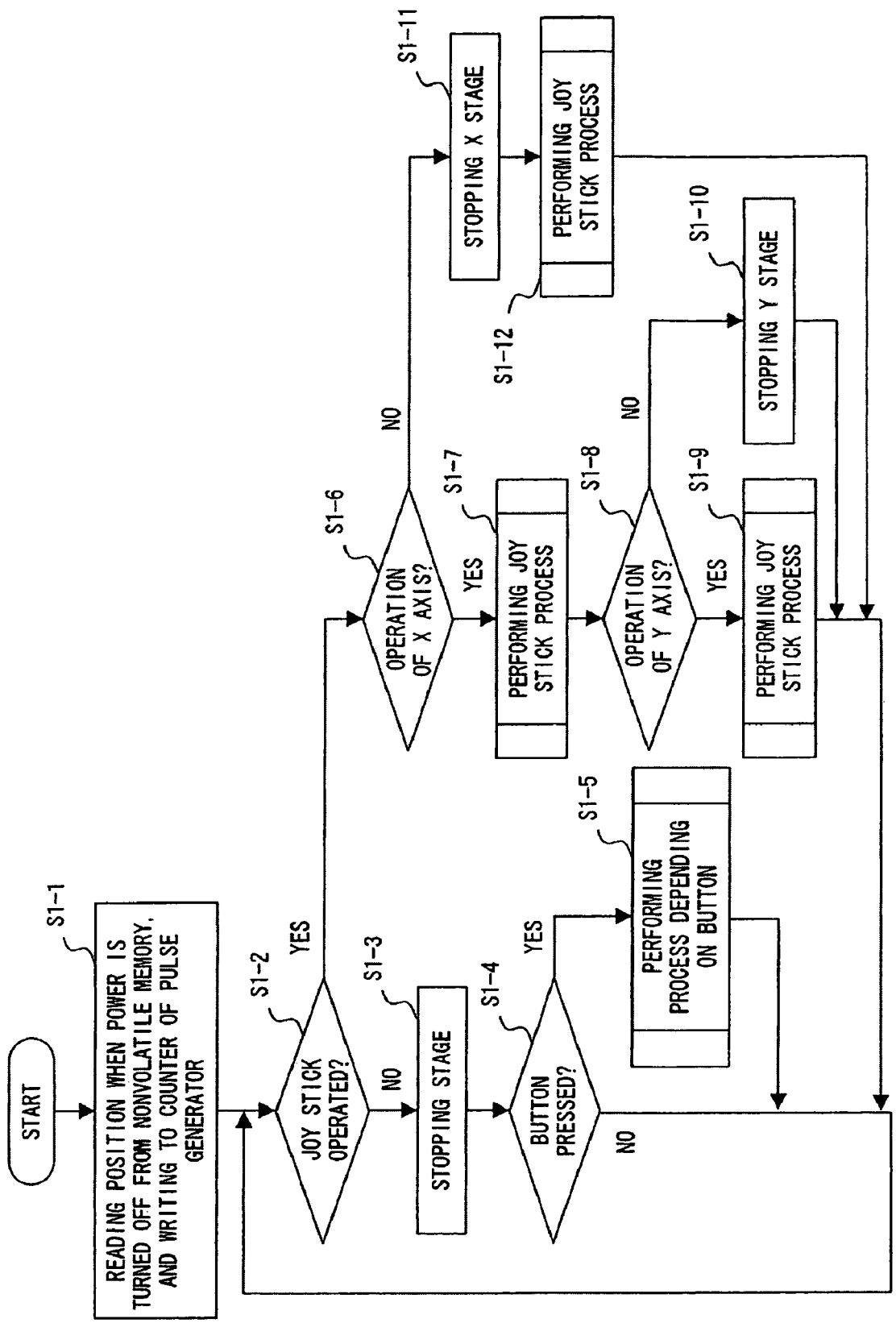
F I G. 7

80

| DIGITAL DATA | PULSE SPEED [pps] |
|---|---|
| 0 | −4000 |
| 1 | −3600 |
| 3 | −3500 |
| ⋮ | ⋮ |
| 121 | −2 |
| 122 | −2 |
| 123 | −1 |
| 124 | −1 |
| 125 | −1 |
| 126 | 0 |
| 127 | 0 |
| 128 | 0 |
| 129 | 1 |
| 130 | 1 |
| 131 | 1 |
| 132 | 2 |
| 133 | 2 |
| ⋮ | ⋮ |
| 253 | 3500 |
| 254 | 3600 |
| 255 | 4000 |

F I G. 9

| STORAGE NO. | POSITION | | STOP DIRECTION | |
| --- | --- | --- | --- | --- |
| | X AXIS | Y AXIS | X AXIS | Y AXIS |
| 0 | 0 | 0 | 1 | 1 |
| 1 | 0 | 0 | 1 | 1 |
| 2 | 0 | 0 | 1 | 1 |
| 3 | 0 | 0 | 1 | 1 |
| 4 | 0 | 0 | 1 | 1 |
| 5 | 0 | 0 | 1 | 1 |
| 6 | 0 | 0 | 1 | 1 |
| 7 | 0 | 0 | 1 | 1 |
| 8 | 0 | 0 | 1 | 1 |
| 9 | 0 | 0 | 1 | 1 |
| 10 | 0 | 0 | 1 | 1 |
| 11 | 0 | 0 | 1 | 1 |
| 12 | 0 | 0 | 1 | 1 |
| 13 | 0 | 0 | 1 | 1 |
| 14 | 0 | 0 | 1 | 1 |
| 15 | 0 | 0 | 1 | 1 |

FIG. 12

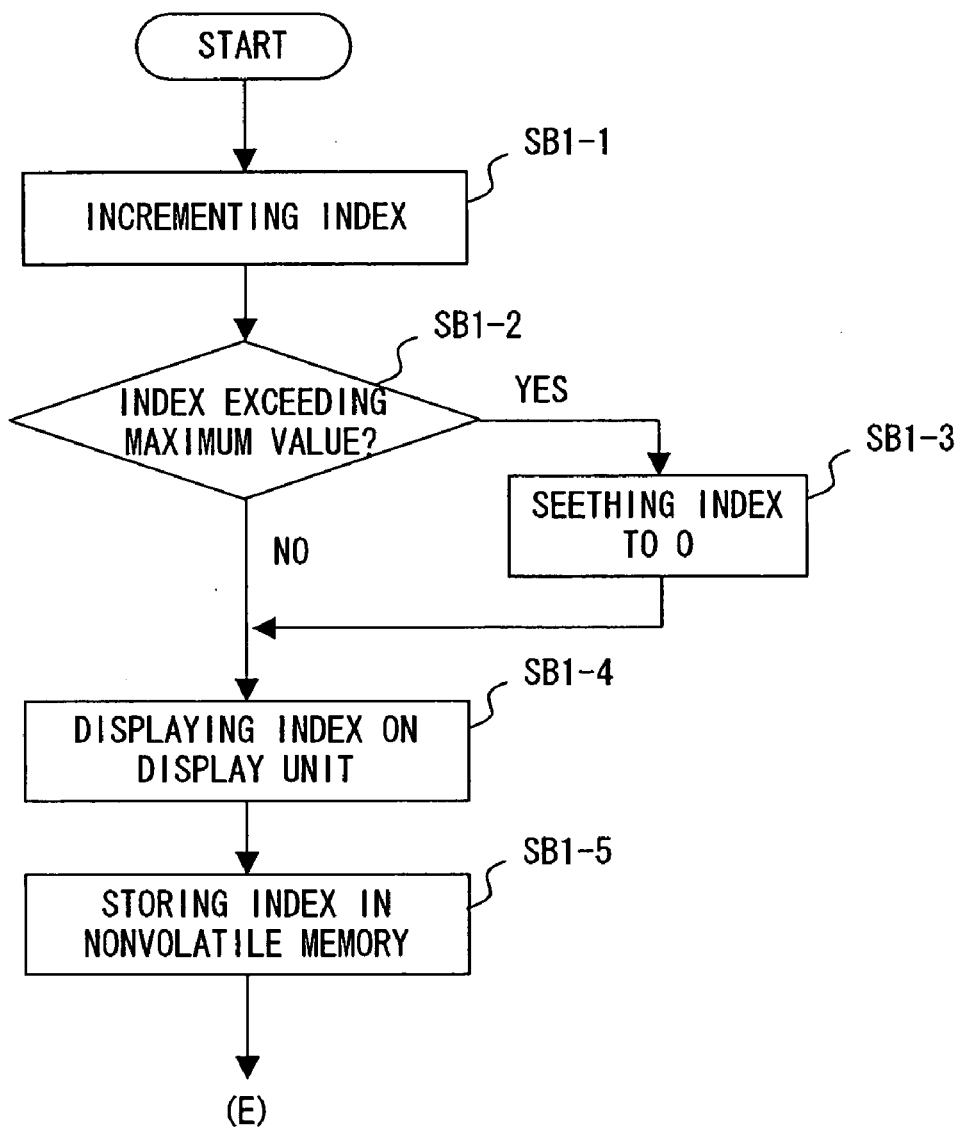
F I G. 1 3

90

| STORAGE NO. | POSITION | | STOP DIRECTION | |
|---|---|---|---|---|
| | X AXIS | Y AXIS | X AXIS | Y AXIS |
| 0 | 0 | 0 | 1 | 1 |
| 1 | 0 | 0 | 1 | 1 |
| 2 | 0 | 0 | 1 | 1 |
| 3 | 0 | 0 | 1 | 1 |
| 4 | 0 | 0 | 1 | 1 |
| 5 | 0 | 0 | 1 | 1 |
| 6 | 2000 | 50000 | −1 | −1 |
| 7 | 0 | 0 | 1 | 1 |
| 8 | 0 | 0 | 1 | 1 |
| 9 | 0 | 0 | 1 | 1 |
| 10 | 0 | 0 | 1 | 1 |
| 11 | 0 | 0 | 1 | 1 |
| 12 | 0 | 0 | 1 | 1 |
| 13 | 0 | 0 | 1 | 1 |
| 14 | 0 | 0 | 1 | 1 |
| 15 | 0 | 0 | 1 | 1 |

FIG. 16

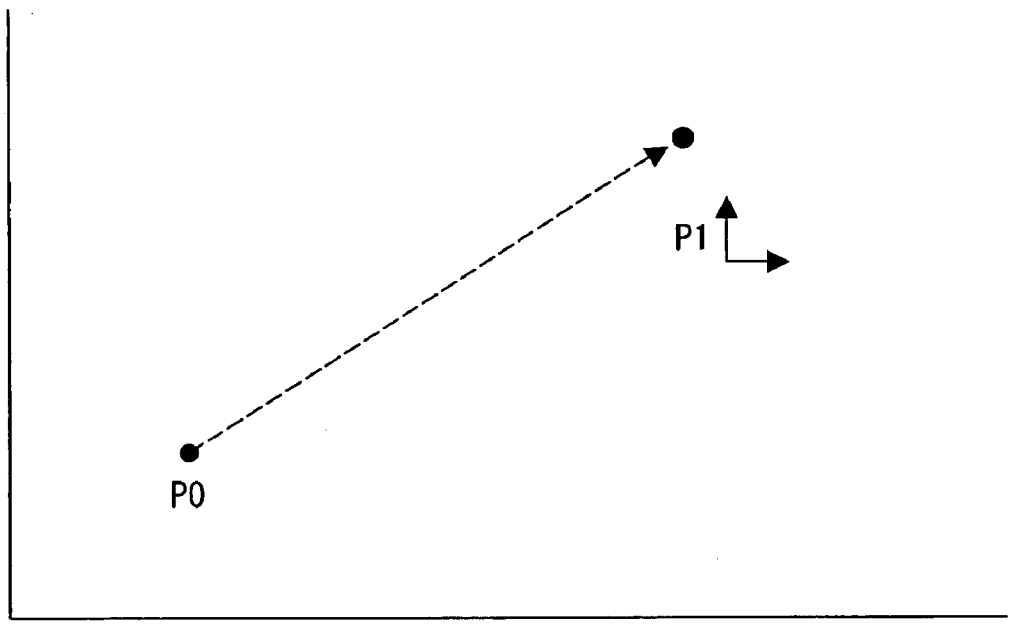
F I G. 1 9

| COMMAND | NAME | OPERATION |
|---|---|---|
| ORG | ORIGIN DETECTING OPERATION | TRANSFER STAGE TO ORIGIN DESIGNATED BY ORIGIN SENSOR AND RESET POSITION (COORDINATES) |
| MOVERR? | TRANSFER AMOUNT ERROR ACQUISITION | REPORT TRANSFER AMOUNT ERROR ERR_X, ERR_Y |
| POS? | POSITION AQUISITION | REPORT STAGE POSITION AX, AY |
| DIR? | TRANSFER STOP DIRECTION ACQUISITION | REPORT DIRECTION DIR_X, DIR_Y WHEN STAGE HAS STOPPED |
| MOVABS ax, ay | TRANSFER | TRANSFER STAGE TO (ABSOLUTE) POSITION DESIGNATED BY AX AND AY |

FIG. 26

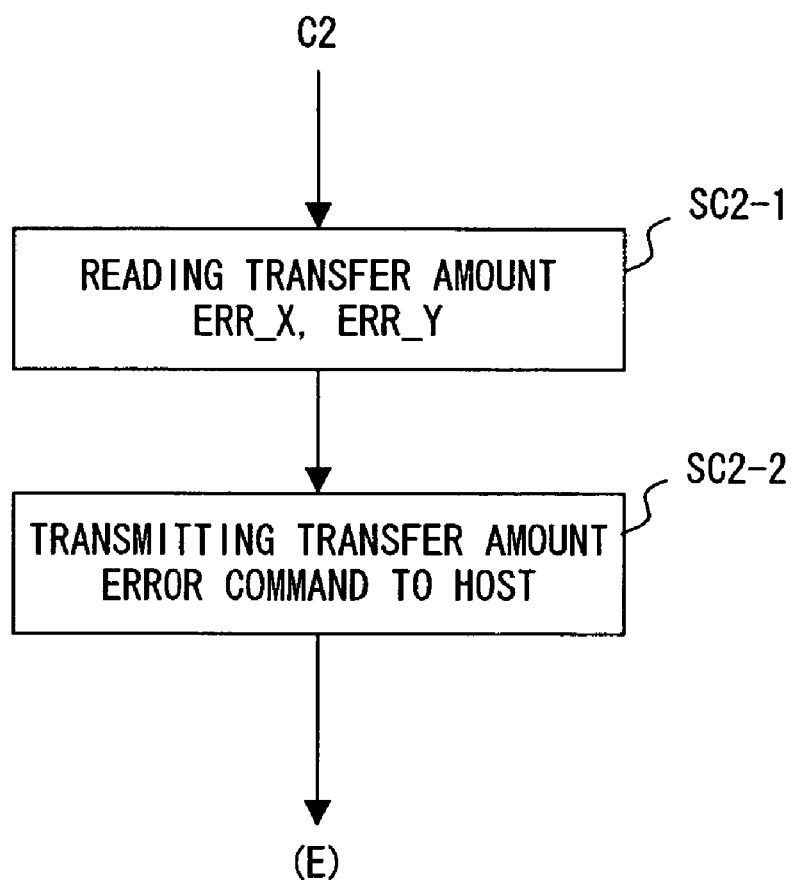
F I G. 30

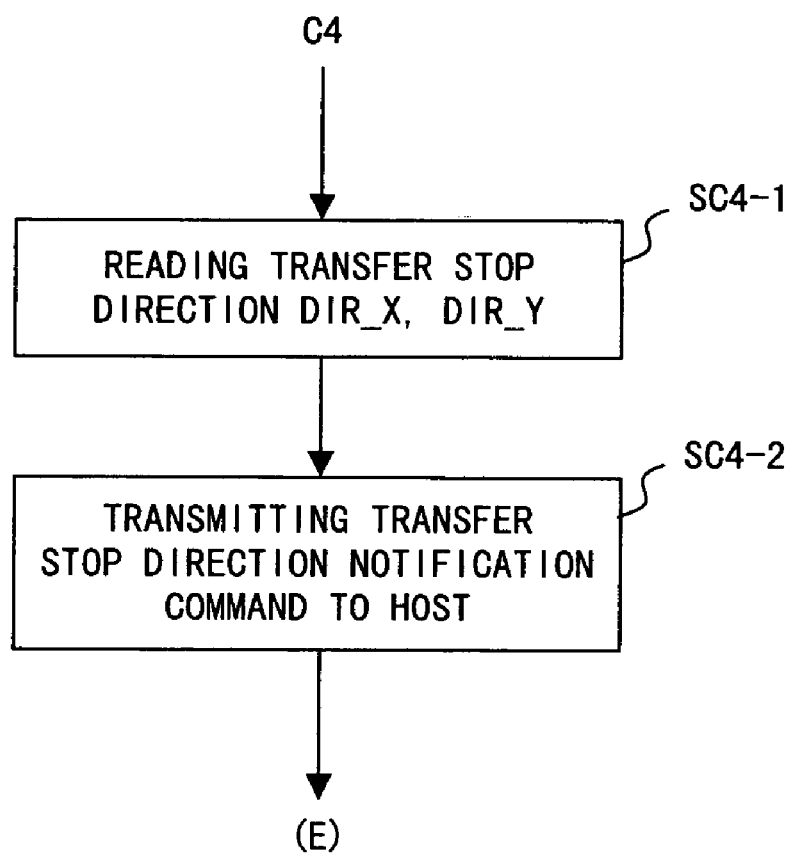
F I G. 32

CONTROL SYSTEM, CONTROL APPARATUS, AND CONTROL METHOD FOR MICROSCOPE STAGE

CROSS REFERENCE TO RELATED APPLICATION

This application is based on and claims the benefit of priority from the prior Japanese Patent Application No. 2003-329150 filed in Japan on Sep. 19, 2003, the entire contents of which are incorporated by this reference.

BACKGROUND OF THE INVENTION

1. Field of the Invention

The present invention relates to a power stage for a microscope which is attached to an optical microscope for two-dimensional power transfer of an observation target.

2. Description of the Related Art

A microscope is used in various systems depending on each use in various fields of medicine, biology, industry, etc. Especially, in the industrial field including semiconductor manufacture, automated apparatuses including a microscope have been studied from the early stages in the development to save labor or improve correctness, thereby successfully realizing automated operation and drive units of microscopes.

Thus, a microscope which has been very expensive at the initial stage has been marketed as a less expensive or inexpensive product with an increasing demand.

On the other hand, in the fields of medicine and biology, an automated microscope has become inexpensive with an increasing demand. Thus, the demand for a more operable and inexpensive automated microscope has grown sharply. For example, Japanese Patent Application Laid-open No. Hei 9-120031 describes a capture device and a microscopic image transmission system including: a transferable stage which fixes a test subject; a capture unit for capturing the test subject on the stage transferred to an arbitrary position and outputting a capture signal; an acquisition unit for acquiring absolute coordinates indicating the absolute position of the stage corresponding to the capture signal; a storage unit for storing the absolute coordinates; and a transfer control unit for moving the stage based on the stored value of the storage unit when the test subject is fixed again to the stage.

With the above-mentioned capture device and microscopic image transmission system, the capture unit first captures the test subject on the stage moved to an arbitrary position, and outputs a capture signal. Then, the absolute coordinates indicating the absolute position of the stage corresponding to the capture signal are acquired and stored in the storage unit.

When the test subject is fixed again to the stage, the stage is moved based on the stored value in the storage unit.

Thus, the position of the stage can be correctly specified when the same sample is observed again with the capture device and the microscopic image transmission system.

The stage for a microscope can be positioned while searching for a desired observation point by continuously performing a scanning operation on the plane. On the conventional stage for a microscope there necessarily occurs an error between the amount of drive of a drive unit of a motor, etc. and the corresponding amount of stage displacement. The error is mainly caused by the backlash from the irregularity between the gears configuring a gear train of a power transmission unit.

Although the irregularity between the gears can be reduced by the adjustment of a mechanical structure of the gears, a change with time of the gears, for example, due to the friction during the operation of the stage, inevitably causes a backlash.

The power stage for a microscope is one of the important components of a power microscope. In the system including a power microscope using a personal computer as the center, an operator selects in advance a plurality of observation and measurement points on a sample using a joy stick, a track ball, etc., and temporarily stores the coordinates of their positions so that the operator can automatically perform image processing, a measuring process, etc. on the selected observation and measurement points using the program of the personal computer.

In this case, it is important to eliminate an error between the observation and measurement points selected in advance by an operator and the observation and measurement points in the automatic control.

To remove the influences of the above-mentioned backlash and position selection error, and to suppress an error between the amount of drive of a drive unit and the corresponding amount of stage displacement, Japanese Patent Application Laid-open No. Hei 7-272660 includes: a sample stage loaded with a sample; a sample position detection unit for detecting the position of a sample; a drive unit for moving a sample stage; an operation unit for operating the transfer of a sample stage; and a control unit for controlling a drive unit according to a signal from a operation unit. The control unit is loaded with a sample stage drive apparatus configured to control the drive unit according to a signal of the transfer of a sample from a operation unit and a signal indicating the actual transfer of a sample from a sample position detection unit.

The above-mentioned sample stage drive apparatus controls the drive of a sample stage according to a signal indicating the actual transfer of a sample from a sample position detection unit for detecting the position of the sample, quickly drives the stage which eliminates a backlash, and then correctly moves the stage.

However, Japanese Patent Application Laid-open No. Hei 9-120031 includes a power stage having an acquisition unit for obtaining the absolute coordinates of the current position in the X-Y direction. When a command "Obtain the X-Y coordinates" is issued from a personal computer through an interface, then the power stage obtains the current X and Y coordinates, and returns them to the personal computer through the interface.

The absolute coordinates of the power stage refer to the X-Y coordinates with the mechanical origin of the power stage defined as the coordinate origin. Although not described in Japanese Patent Application Laid-open No. Hei 9-120031, the acquisition unit for obtaining the absolute coordinates of the current position in the X-Y direction requires the configuration of a linear encoder, etc. for detecting the amount of mechanical displacement from the coordinate origin, the velocity, etc. as the amount of electricity in the XY direction of a stage.

That is, since two expensive linear encoders are required, the power stage and the microscope apparatus become very expensive.

Furthermore, since a linear encoder and a detection head for reading the pattern of a linear encoder are attached in the X and Y directions of the stage, the operability around the stage is not preferable when an observing operation is performed.

Japanese Patent Application Laid-open No. Hei 7-272660 requires a linear encoder, a laser interferometer, etc. as a sample position detection unit, thereby producing a very expensive configuration.

Due to the above-mentioned problem, since there occurs a lost motion (movement which is not output by the relationship among idle operations, mechanical rigidity, friction, etc.) from a backlash (idle operations between mechanical elements on the contact surfaces) on any precise mechanism when a desired position of a power stage is stored and the power stage for a microscope is recovered to the position again, the conventional power stage for a microscope has the problem of an error in the recovery position.

SUMMARY OF THE INVENTION

To solve the above-mentioned problems, the present invention provides an inexpensive power stage for a microscope, control apparatus, and a control method capable of obtaining the position of the power stage for a microscope and recovering to the position with the influence of the lost motion by a backlash taken into account.

The control system of the stage of the microscope according to the present invention includes: a stage transfer unit for a transfer of the stage for loading a sample perpendicular to the optical axis of the microscope; a transfer command acquisition unit for obtaining command information for the transfer of the stage; a stop position direction storage unit for storing stop position direction information which is the information generated according to the command information obtained from the transfer command acquisition unit, and the information about the position and direction when the operation of the stage transfer unit is stopped; and a stage transfer control unit for controlling the operation of the stage transfer unit according to the stop position direction information stored in the stop position direction storage unit.

The control apparatus of the stage of the microscope according to the present invention includes: an acquisition unit for obtaining transfer information which is the information for a transfer of the stage of the microscope having a stage for loading a sample perpendicular to the optical axis of the microscope; a stop position direction storage unit for storing stop position direction information which is the information generated according to the transfer information obtained by the acquisition unit when the transfer of the stage is stopped, and the information about the position and direction when the stage is stopped; a stage transfer control unit for controlling the operation of the stage according to the stop position direction information stored in the stop position direction storage unit.

The control method for the stage of the microscope of the present invention includes the steps of: obtaining command information for a transfer of a stage for loading a sample perpendicular to the optical axis of the microscope; and controlling the transfer of the stage according to stop position direction information which is the information obtained according to the command information and the information about the position and direction when the stage is stopped.

BRIEF DESCRIPTION OF THE DRAWINGS

FIG. 1 shows the entire configuration of the microscope system using a power stage for a microscope according to the first embodiment of the present invention;

FIG. 6 shows the external configuration of the operation unit according to the first embodiment of the present invention;

FIG. 7 is a flowchart of the process of the control to be performed in the operation of the operation unit according to the first embodiment of the present invention;

FIG. 9 is a speed conversion table according to the first embodiment of the present invention;

FIG. 12 is a stop position direction table according to the first embodiment of the present invention;

FIG. 13 is a flowchart showing the process performed when an increment button 56-2a is operated (A1 shown in FIG. 11) according to the first embodiment of the present invention;

FIG. 16 shows an example of a stop position direction table 90 updated according to the first embodiment of the present invention;

FIG. 19 shows a recovery operation realized by the process shown in FIG. 18 according to the first embodiment of the present invention;

FIG. 26 shows a command set of the control unit 32 according to the second embodiment of the present invention;

FIG. 30 is a detailed flowchart performed when a transfer amount error acquisition command is received (process C2 shown in FIG. 28) according to the second embodiment of the present invention;

FIG. 32 is a detailed flowchart performed when a transfer stop direction acquisition command is received (process C4 shown in FIG. 28) according to the second embodiment of the present invention.

DESCRIPTION OF THE PREFERRED EMBODIMENTS

<First Embodiment>

According to the present embodiment, since there occurs a lost motion (movement which is not output by the relationship among idle operations, mechanical rigidity, friction, etc.) from a backlash (idle operations between mechanical elements on the contact surfaces) on any precise mechanism when a desired position of a power stage for a microscope is stored and the power stage for a microscope is recovered to the position again, the power stage for a microscope stage system is explained below with the above-mentioned influence taken into account.

The influence of the lost motion is described first. If no lost motion occurs when a power stage for a microscope is stopped in a predetermined position, a stop can be made in the desired position without fail. However, it is practically impossible. If a lost motion occurs, a predicted stop position is different from an actual stop position.

The difference depends on the operation (stop direction and speed immediately before the stop) of the power stage for a microscope immediately before the stopping operation. For example, if a power stage for a microscope which has been transferred upwards is stopped, it stops in the position a little above the predicted stop position. Thus, the influence of a lost motion is unexpectedly serious in a observation using a microscope for magnifying a small sample. Therefore, according to the present embodiment, the control system of the stage of the microscope is described below with the above-mentioned influence taken into account.

Figure 2:
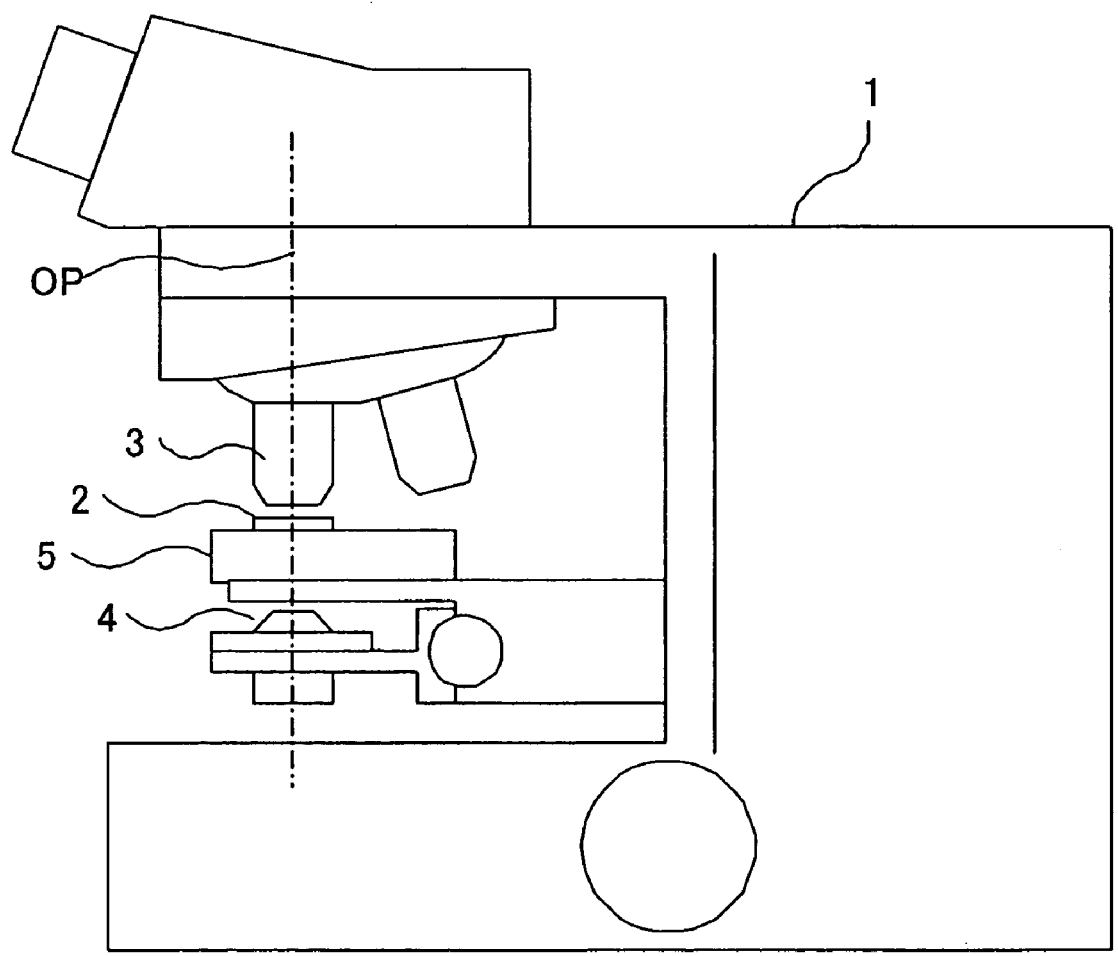
FIG. 2 shows the relationship between the microscope and the power stage for a microscope according to the first embodiment of the present invention.

FIG. 1 shows an entire configuration of the microscope system using a power stage for a microscope according to the first embodiment of the present invention. A microscope 1 comprises a power stage 5 and connected to the control unit 32 described later, and the control unit 32 are controlled by equipment 70 (hereinafter referred to as a host) such as a personal computer, etc. through an external communications unit. The control unit 32 is connected to an operation unit 56. FIG. 2 shows the relationship between the microscope and the power stage for a microscope. In FIG. 2. in the position on the optical axis OP of the microscope 1 where a sample 2, which is an observation target loaded on the power stage 5, is inserted, a objective lens 3 for enlarging and observing the sample 2, and a capacitor 4 for emitting sufficient light to the sample 2 are arranged as adjustable in a predetermined position.

To obtain sufficient optical performance from the microscope 1, normally the sample 2, the objective lens 3, and the capacitor 4 are arranged in space of several millimeters. Therefore, the thickness allowed for the power stage 5 for a microscope is several ten millimeters.

Figure 3:
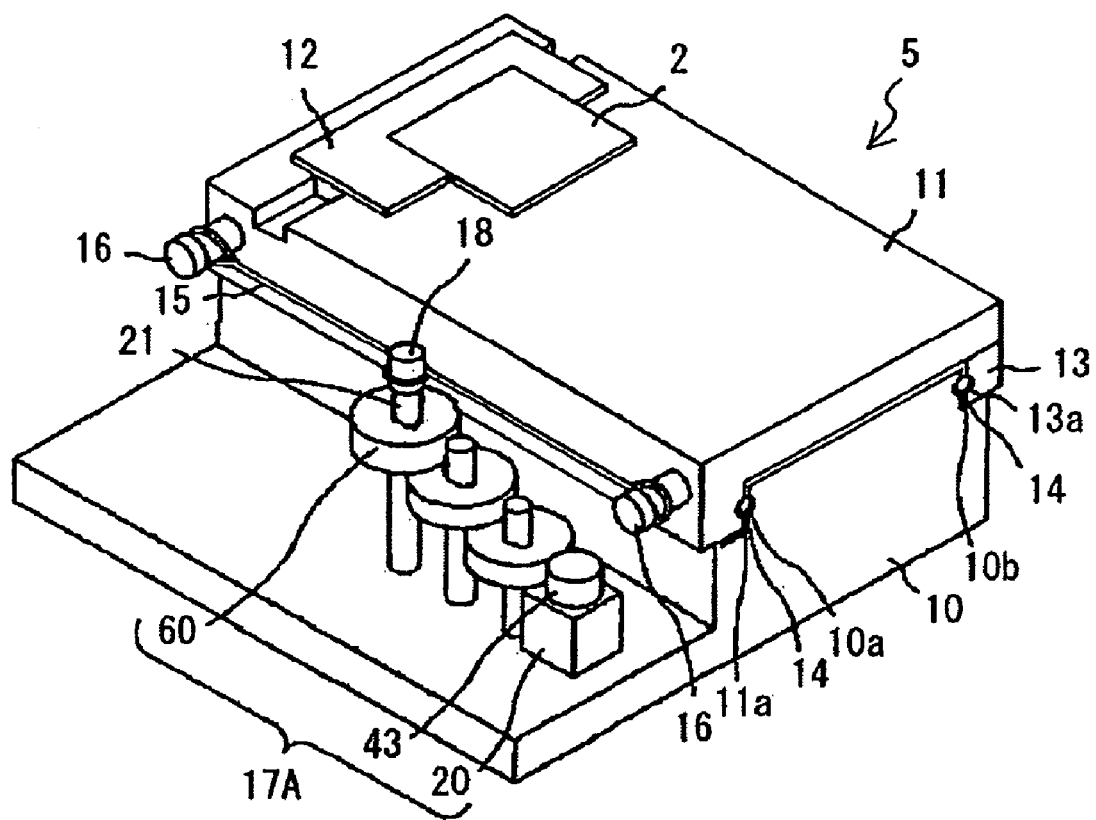
FIG. 3 is a perspective view of the power stage for a microscope according to the first embodiment of the present invention.

FIG. 3 is a perspective view of the power stage for a microscope according to the first embodiment of the present invention. In FIG. 3, the power stage 5 is loaded with the sample 2 on the movable member 11 which can be moved in one direction with a fixing member 10 for fixing to the microscope 1. In the perpendicular direction, a clip 12 which slides on the movable member 11 with the sample 2 inserted performs two-dimensional scanning on the sample 2 along the optical axis OP.

A guide (Y direction) between the fixing member 10 and the movable member 11 is explained below. The power stage 5 can normally move in two directions orthogonal to each other. Since the configurations and the operations are similar to each other, the explanation of another guide (X direction) is omitted here. V-shaped guide grooves 10a and 10b are formed in the fixing member 10.

A holding member 13 is attached to the movable member 11, and V-shaped guide grooves 11a and 13a parallel to the guide grooves 10a and 10b of the fixing member 10 are formed. A ball 14 is inserted to the opposing guide grooves, and the fixing member 10 is held by the movable member 11 and the holding member 13, and the holding member 13 is attached to the movable member 11. Therefore, the movable member 11 is firmly held. Furthermore, since it is held by the ball 14 on a point, it has a small sliding resistance, thereby possibly moving in one direction.

A power transmission unit can be a wire rope 15 produced by twisting thin metal lines. Both ends of the wire rope 15 are made circular, and applied between two support pins 16 on the movable member 11. One support pin 16 is movable in the direction of the wire rope 15. On the fixing member 10, a decelerator 17A is provided. A pulley 18 provided on an output axis 21 of the decelerator is arranged in the position touching the straight line connecting the two support pins 16, and the wire rope 15 is wound around the pulley 18 once.

By moving the movable support pin 16 and enhancing the tension of the wire rope 15, the friction between the pulley 18 and the wire rope 15 can be enhanced, thereby eliminating slippage between the wire rope 15 and the pulley 18 so far as there occurs overload. Since the pulley 18 is arranged in the position of touching the wire rope 15, the total length of the wire rope 15 is not changed with the transfer of the movable member 11. By the operation of these two components, the rotation of the pulley 18 can be correctly transmitted to the wire rope 15, and the number of rotations of the pulley 18 can be correctly converted to the amount of linear movement of the movable member 11.

A drive unit can be a Y stepping motor 20. The Y stepping motor 20 receives a pulse signal from an external unit, pulls the rotor by the electromagnetic force generated by the stator coil, and the output axis is rotates by the degrees proportional to the pulse signal. The Y stepping motor 20 is assigned a rotation of 200 divisions of an output axis. When one pulse signal is externally issued, the motor output axis makes 1.8° turn.

When the pulley for driving a wire rope is directly attached to the output axis of the Y stepping motor 20 provided for the fixing member 10, the diameter of the pulley is 0.15 mm to obtain the resolution of 2.5 μm, which is not practical. Therefore, the decelerator 17A using spur gears to enhance the resolution is arranged on the fixing member 10. The decelerator 17A is configured by a plurality of spur gears having different numbers of teeth on the same axis to decelerate by the gear trains having different numbers of teeth. A set of gears have numbers of teeth in a ratio of 1:4, and a gear 60 of the output axis 21 and a motor gear 43 of the output axis of the Y stepping motor 20 are combined into three sets of gear trains, thereby attaining the acceleration rate of 1/64.

With the above-mentioned configuration, the amount of transfer of the movable member 11 in one step of the Y stepping motor 20 has the resolution of $$10 \text{ [mm]} \times \pi/(200 \times 64) = 2.5 \text{ [μm]}$$

where the diameter of the pulley 18 of the output axis 21 of the accelerator around which the wire rope 15 is wound set to 10 mm, and the number of divisions of the Y stepping motor 20 set to 200.

Described below is the origin detection unit and the control unit for managing the position of the stage.

Figure 4:
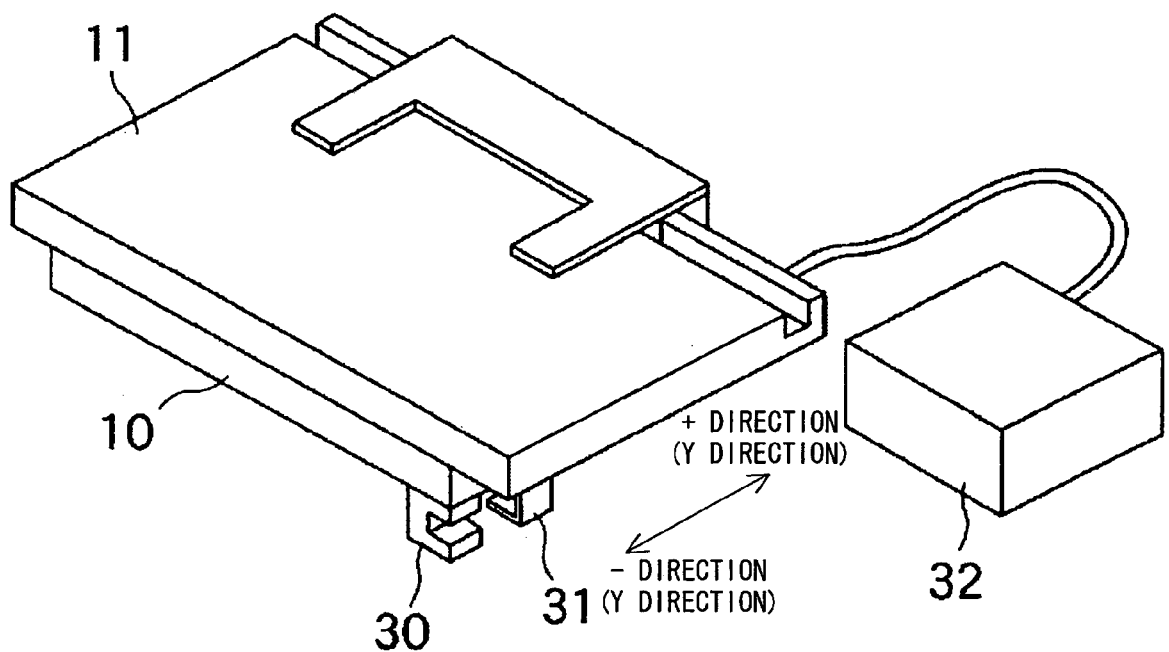
FIG. 4 is a perspective view of a control unit for controlling the position of the stage according to the first embodiment of the present invention.

FIG. 4 is a perspective view of a control unit for controlling the position of the stage according to the first embodiment of the present invention. In FIG. 4, the fixing member 10 is provided with a Y origin sensor 30 of photo interrupter type. The movable member 11 is also provided with a visor 31 for cutting off light for the Y origin sensor 30. The Y origin sensor 30 and the visor 31 configures a origin detection unit. When the movable member 11 is driven, the movable member 11 is moved in a predetermined direction, and the visor 31 cut off light for the Y origin sensor 30.

That is, the position of the origin of the movable member 11 for the fixing member 10 is aligned in advance, and then the movable member 11 is driven according to the pulse signal output from the control unit 32. Thus, by the control unit 32 as a control unit, the number of output pulses to the Y stepping motor 20 is managed, thereby successfully managing the position of the movable member 11.

The control unit 32 as a control unit is explained below. The control unit comprises a position detection unit, a position direction storage unit, a recovery control unit, a transfer amount error detection unit, and an error correction control unit.

Figure 5:
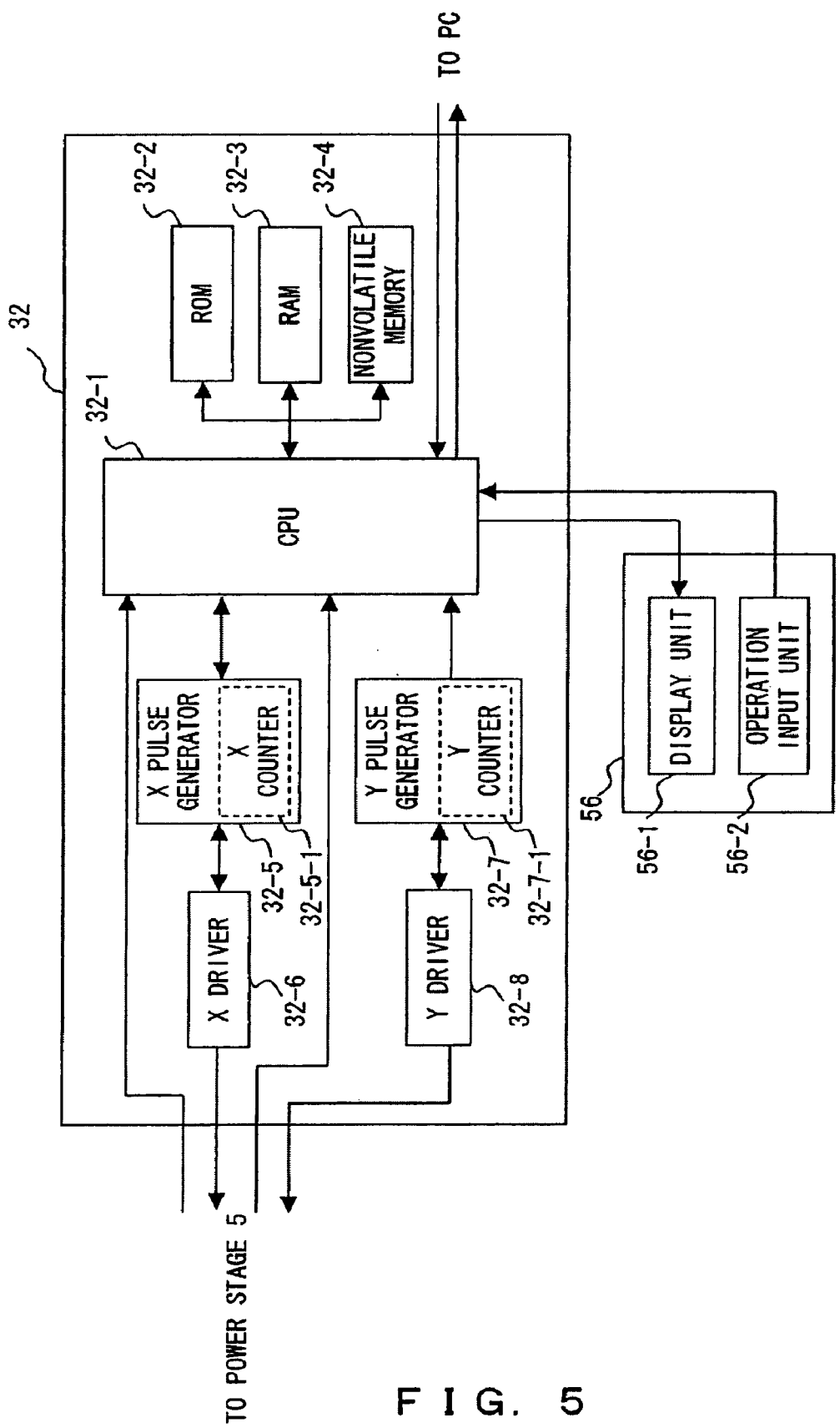
FIG. 5 shows the configuration of a control unit 32 according to the first embodiment of the present invention.

FIG. 5 shows the configuration of the control unit 32 according to the present embodiment. The control unit 32 comprises a CPU (central processing unit) 32-1, ROM (read only memory) 32-2, RAM (random access memory) 32-3, nonvolatile memory 32-4, an X pulse generator 32-5, an X driver 32-6, a Y pulse generator 32-7, and a Y driver 32-8. These components are interconnected via a CPU bus.

The ROM 32-2 stores a program describing the control contents. The RAM 32-3 stores data such as control arithmetic, etc. The nonvolatile memory 32-4 can be EEPROM (electrically erasable programmable ROM), NVRAM (non volatile RAM), flash memory, etc. Necessary information is stored and read by executing programs.

The X pulse generator 32-5 outputs a transfer direction signal and a pulse signal depending on the drive parameter to the X driver 32-6 by writing the drive parameter such as the transfer direction, the number of pulses, the pulse speed, the acceleration/deceleration system, etc. from the CPU 32-1. Upon receipt of a transfer direction signal and a pulse signal, the X driver 32-6 outputs a drive pulse to be applied to the X stepping motor not shown in the attached drawings based on the transfer direction signal or pulse signal received.

The X pulse generator 32-5 includes an X counter 32-5-1, and counts up or down the counter values with direction and number of output pulses. The CPU 32-1 can read the value of the X counter 32-5-1 through a CPU bus, and write an arbitrary value to the X counter 32-5-1. The CPU 32-1 can read the sensor signal of the X origin sensor not shown in the attached drawings but arranged in the fixing member 10.

The Y pulse generator 32-7 outputs a transfer direction signal and a pulse signal depending on the drive parameter by writing a drive parameter such as the transfer direction, the number of pulses, the pulse speed, the acceleration/deceleration system, etc. from the CPU 32-1. Upon receipt of a transfer direction signal and a pulse signal, the Y driver 32-8 outputs a drive pulse to be applied to the Y stepping motor 20 based on the transfer direction signal or pulse signal received.

The Y pulse generator 32-7 includes a Y counter 32-7-1. With direction and number of output pulses, the counter can be up-count or down-count. The CPU 32-1 can read at any time the count of the Y counter 32-7-1 through the CPU bus, and can write an arbitrary value to the Y counter 32-7-1.

The CPU 32-1 can read the sensor signal of the Y origin sensor 30 arranged in the fixing member 10 at any time. The control unit 32 is connected from the operation unit 56 as a man-machine interface. The operation unit 56 is configured by the a display unit 56-1, a operation input unit 56-2, a joy stick not shown in the attached drawings.

FIG. 6 shows the external configuration of the operation unit according to the present embodiment In FIG. 6, the operation unit 56 comprises the display unit 56-1, a plurality of buttons 56-2a through 56-2d, and a joy stick 56-3. Each of them are connected to the CPU 32-1. The buttons 56-2a through 56-2d outputs operation signal depending on the pressing and releasing operations to the CPU 32-1, and the CPU 32-1 can read the operation signal.

The joy stick 56-3 input an operation signal depending on the angle of the operation from the neutral position, and the input operation signal is transmitted to the CPU 32-1. The CPU 32-1 can read the operation signal. Upon receipt of the operation input from the operation unit 56, the CPU 32-1 controls each portion depending on the operation input. That is, in cooperation with the operation of the joy stick 56-3, the movable member 11 is operated on the two-dimensional plane or operates the cursor displayed on the display unit of the Host 70.

In addition, the display unit 56-1 displays the operation status, the position information, etc. of each unit at a command from the CPU 32-1.

The control unit 32 is provided with external communications units (hereinafter referred to as an I/F (interface)) such as RS-232C, USB, Ethernet, etc. When the Host 70 transmits or receives a command to and from the CPU 32-1 through the I/F, it controls the drive unit as if it were operated by the operation unit 56, and communicates information with an external device.

The operation of the power stage for a microscope is explained below.

FIG. 7 is a flowchart of the process of the control to be performed in the operation of the operation unit according to the first embodiment of the present invention. By the operation of the joy stick 56-3, an operation of selecting a measurement point is performed. First, when the system is powered up, the CPU 32-1 reads the X position and the Y position when the system is powered off from the nonvolatile memory 32-4, writes the X position to the X counter 32-5-1 of the X pulse generator 32-5, and writes the Y position to the Y counter 32-7-1 of the Y pulse generator 32-7 (S1-1). The units of the X position and the Y position read from the nonvolatile memory 32-4 are the numbers of the output pulses counted by the X counter 32-5-1, and the Y counter 32-7-1.

Then, it is determined whether or not the joy stick 56-3 has been operated (S1-2). When the joy stick 56-3 is operated ("YES" in S1-2), the CPU 32-1 detects it, and starts processing. The CPU 32-1 reads the operation angle of the joy stick 56-3. For example, the joy stick 56-3 contains the mechanism of changing the resistance value depending on each angle with the X and Y axes perpendicular to each other, and the CPU 32-1 detects the resistance value as a voltage, performs an A/D transform, and then reads the 8-bit digital data having the values from 0 to 255.

Figure 8:
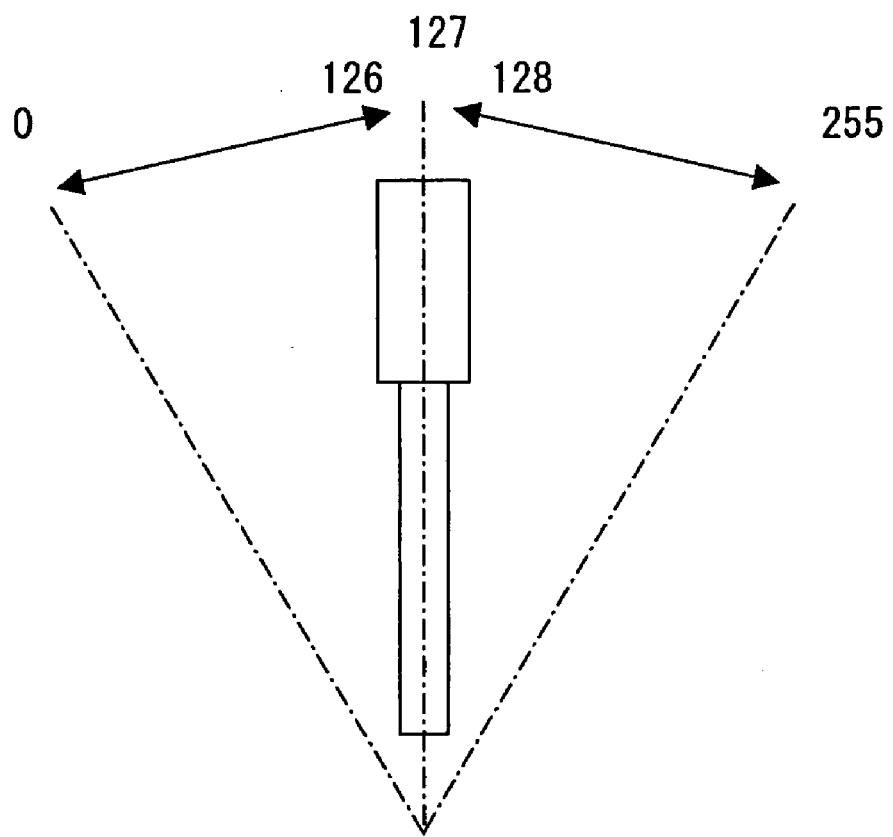
FIG. 8 shows the relationship between the operation angle and the digital data according to the first embodiment of the present invention.

FIG. 8 shows the relationship between the operation angle and the digital data according to the present embodiment. As shown in FIG. 8, the operation angle of the joy stick corresponds to 8-bit digital data having the values from 0 to 255. The digital data is set for each of the X axis angle and the Y axis angle. The CPU 32-1 reads two pieces of digital data, that is, the operation angle of the joy stick 56-3 as the X axis angle and the Y axis angle.

When the operation of the joy stick 56-3 is detected, the operation can be (1) operation to be performed for the X and Y axes, (2) only the X axis is operated, and (3) only the Y axis is operated.

The case (1) in which both X and Y axes are operated is explained below. In S1-2, when the joy stick 56-3 is operated, and the CPU 32-1 detects that it is transmitted in the X axis direction (YES in S1-6), the joy stick process is performed (S1-7). Furthermore, when the CPU 32-1 detects that the operation is transmitted in the Y axis direction (YES in S1-8), the joy stick process is performed (S1-9).

The case (2) in which only the X axis is operated is explained below. In S1-2, when the joy stick 56-3 is operated, and the CPU 32-1 detects that it is transmitted in the X axis direction (YES in S1-6), the joy stick process is performed (S1-7) In this case, since the operation in the Y axis direction is not performed, the operation in the Y axis direction is not detected by the CPU 32-1, the answer is NO in S1-8, and the movable member 11 is not driven in the Y axis direction.

The movable member 11 which is only driven in the X axis direction, but does not perform a driving operation in the Y axis direction is hereinafter referred to as an X stage, or an X axis stage. Similarly, the movable member 11 which is only driven in the Y axis direction, but does not perform a driving operation in the X axis direction is hereinafter referred to as an Y stage, or an Y axis stage.

The case (3) in which only the Y axis is operated is explained below. In S1-2, the joy stick 56-3 is operated, and the CPU 32-1 determines whether or not it is the operation in the X axis direction (S1-6). The CPU 32-1 determines that it is not the operation in the X axis direction (NO in S1-6), that is it is the operation in the Y axis direction, and the X stage is not driven, but set still (S1-11) . Then, the joy stick process is performed (S1-12).

Before explaining the detailed process of S1-7, S1-9, and S1-12, the table shown in FIG. 9 is explained first.

FIG. 9 is a table for conversion (speed conversion table 80) from digital data to a pulse speed from the operation angle of the joy stick according to the present embodiment of the present invention. The table 80 is stored in the ROM 32-2 and the nonvolatile memory 32-4 in advance. The speed conversion table 80 contains a pulse speed set corresponding to each piece of digital data from 0 to 225. The speed conversion table 80 is described later.

Figure 10:
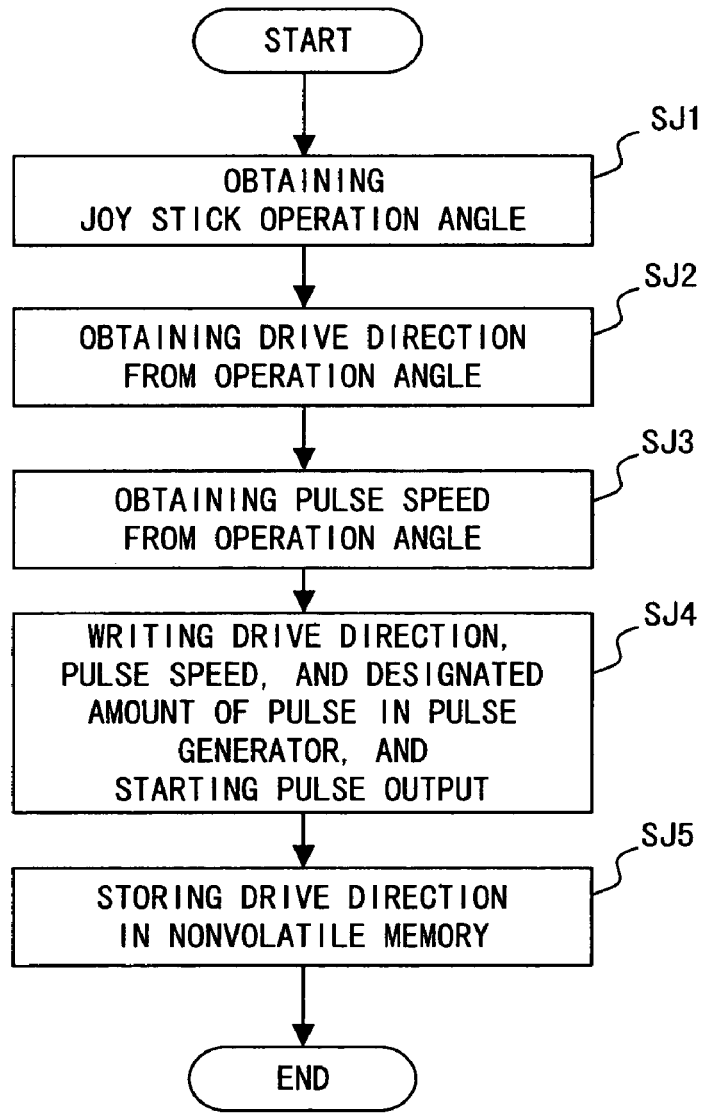
FIG. 10 is a flowchart of the joy stick process performed in the operation in the X and Y axis directions according to the first embodiment of the present invention.

FIG. 10 is a flowchart of the joy stick process performed in the operation in the X and Y axis directions according to the present embodiment of the present invention. First, the joy stick process in the operation in the X axis direction (for example, S1-7 shown in FIG. 7) is explained. The CPU 32-1 reads the digital data of the X axis angle as the operation angle of the joy stick 56-3 (SJ1). The CPU 32-1 obtains the drive direction and a pulse speed using the speed conversion table 80 shown in FIG. 9 from the read digital data (SJ2, SJ3). The obtained pulse speed contains the drive direction. If the pulse speed is positive, it indicates the direction off the origin sensor. If the pulse speed is negative, it indicates the direction toward the origin sensor.

The conversion from the digital data to the pulse speed can be a constant function, proportional function, exponential function, or a combination of them. The CPU 32-1 reads the DIP-SW (dip switch), etc. not shown in the attached drawings, and can select from among the speed conversion table of a constant function, the speed conversion table of a proportional function, the speed conversion table of an exponential function, and the speed conversion table of a combination of a constant function, a proportional function and an exponential function prepared in advance.

Furthermore, if the speed conversion table 80 is configured in the nonvolatile memory 32-4, a conversion into a desired value can be performed through an external communications unit. The speed conversion table 80 of the same X axis and Y axis is used in the present embodiment, but if there are specific conditions, independent speed conversion tables of different conversion systems can be used.

The CPU 32-1 writes the drive direction, the pulse speed, and the designated number of pulses obtained from the speed conversion table 80 to the X pulse generator 32-5, and starts outputting a pulse (SJ4). In this embodiment, the designated number of pulses refers to the number of pulses in a movable range of X and Y respectively. According to the present embodiment, for example, if the movable range in the X axis direction is 70 mm, the following equation holds.

$$28000 [p] = (70000 \ [\mu m]/2.5 \ [\mu m/p])$$

Then, the CPU 32-1 stores the X drive direction in the signed variable dir_X reserved in the RAM 32-3. If the X drive direction is the direction off the origin sensor, then 1 is set in dir_X. If the X drive direction is the direction toward the origin sensor, then −1 is set in dir_X. The CPU 32-1 stores dir_X in the nonvolatile memory 32-4 SJ5).

The joy stick process of the operation in the Y axis direction (for example, S1-9, S1-12 shown in FIG. 7) is explained below. The CPU 32-1 obtains the drive direction and the pulse speed using the speed conversion table 80 shown in FIG. 9 from the digital data read as described above (SJ1 to SJ3).

Then, the CPU 32-1 writes the drive direction, the pulse speed, and the designated number of pulses to the Y pulse generator 32-7, and starts outputting a pulse. The designated number of pulses refers to the number of pulses in a movable range of X and Y respectively. In the present embodiment, assume that the movable range in the Y axis direction is 80 mm, 32,000 p (=80000 μm/2.5 μ/p) (SJ4).

The CPU 32-1 stores the Y axis direction in the signed variable dir_Y reserved in the RAM 32-3. If the Y drive direction is a direction off the origin sensor, 1 is stored in dir_Y. If the Y drive direction is the direction toward the origin sensor, then −1 is set in dir_Y. The CPU 32-1 stores dir_Y in the nonvolatile memory 32-4 (SJ5).

Thus, while the joy stick 56-3 is operating, the processes (1), (2), and (3) above are repeated.

Back in FIG. 7, assume that the operation of the joy stick 56-3 is stopped. When the operation of the joy stick 56-3 is stopped, the CPU 32-1 writes a stop in the X pulse generator 32-5, stops the X direction transfer of the stage, writes a stop in the Y pulse generator 32-7, and stops the Y direction transfer of the stage (S1-3).

Then, the CPU 32-1 detects the operation of the operation unit 56 on the buttons 56-2a through 56-2d (S1-4). The buttons include an increment button 56-2a, a decrement button 56-2b, a storage button 56-2c, and a recovery button 56-2d.

When any of these buttons is operated (YES in S1-4), the process is performed depending on each button (S1-5). If no button is pressed (NO in S1-4), control is returned to the detection of the joy stick 56-3 (S1-2).

Figure 11:
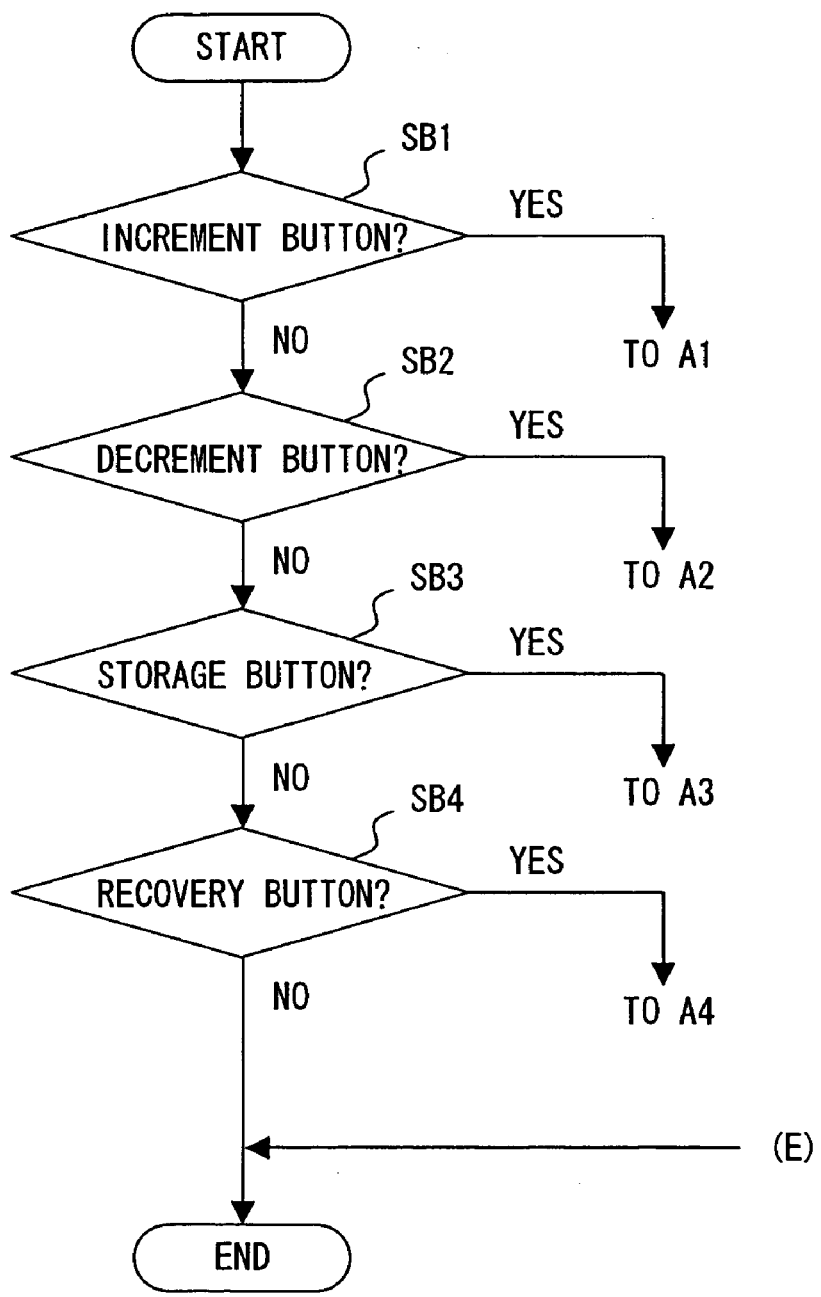
FIG. 11 is a detailed flowchart of the process (process of S1-5 shown in FIG. 7) depending on each button according to the first embodiment of the present invention.

FIG. 11 is a detailed flowchart showing the process (in S1-5 shown in FIG. 7) depending on each button according to the present embodiment. When the operated button is the increment button 56-2a (YES in SB1), the process A1 described later is performed. When the operated button is the decrement button 56-2b (YES in SB2), the process A2 described later is performed. When the operated button is the storage button 56-2c (YES in SB3), the process A3 described later is performed. When the operated button is the recovery button 56-2d (YES in SB4), the process A4 described later is performed.

Before explaining the details of each of the processes A1 through A4, the table shown in FIG. 12 is explained first.

FIG. 12 is a table storing the X position and the Y position, and the direction when a stop is made in the positions according to the first embodiment of the present invention. Hereinafter, the table is referred to as a stop position direction table 90. FIG. 12 shows the data structure (initial value) for the recovery operation according to the present embodiment. The data is stored in the nonvolatile memory 32-4, configured by the data items of "storage No.", "position (X axis)", "position (Y axis)", "stop direction (X axis)", and "stop direction (Y axis)". The table stores 16 sets of these data items. The "storage No." stores the values 0 through 15.

The "position (X axis)" and "position (Y axis)" can be, for example, a predetermined position (for example, the central point on the screen) displayed on the display unit of the Host 70 when the movable member 11 moves on the two-dimensional plane in cooperation with the joy stick 56-3, that is, a predetermined point on the movable member 11, or the position of a cursor when the cursor displayed on the display unit of the Host 70 is operated in cooperation with the joy stick 56-3. That is, the amount of operation of the joy stick from a certain point is stored.

The values stored in the "position (X axis)" and the "position (Y axis)" are the number of output pulses counted by the X counter 32-5-1 and the Y counter 32-7-1 respectively. The values stored in the "stop direction (X axis)" and the "stop direction (Y axis)" refer to the directions of the joy stick 56-3 immediately before the joy stick 56-3 is stopped by the "position (X axis)" and the "position (Y axis)".

That is, if, immediately before the joy stick 56-3 is stopped, the stopping operation is in the direction off the origin sensor in the X drive direction, then 1 is stored in the "stop direction (X axis)". If the stopping operation is in the direction toward the origin sensor in the X drive direction, then −1 is stored in the "stop direction (X axis)". Similarly, if, immediately before the joy stick 56-3 is stopped, the stopping operation is in the direction off the origin sensor in the Y drive direction, then 1 is stored in the "stop direction (Y axis)". If the stopping operation is in the direction toward the origin sensor in the Y drive direction, then −1 is stored in the "stop direction (Y axis)".

FIG. 13 is a flowchart showing the process performed when the increment button 56-2a is operated (A1 shown in FIG. 11) according to the present embodiment. When the increment button 56-2a is operated, the CPU 32-1 detects it, and increments the variable: index reserved in the RAM 32-3 (SB1-1).

index←index+1

This variable: index is the storage No. of the stop position direction table 90 shown in FIG. 12. That is, the variable: index indicates the target data when the storage button 56-2c and the recovery button 56-2d described later are operated. According to the present embodiment, the storage No. can be 16 values, that is, 0 through 15. When the index exceeds the maximum value of 15 (YES in SB1-2), the index is set to 0 (SB1-3). When the index is 15 or less (NO in SB1-2), control is passed to the next process.

The CPU 32-1 displays the index value on the display unit 56-1 (SB1-4). Thus, the operator can be informed of a target storage No., and then the CPU 32-1 stores the index in the nonvolatile memory 32-4 (SB1-5).

Figure 14:
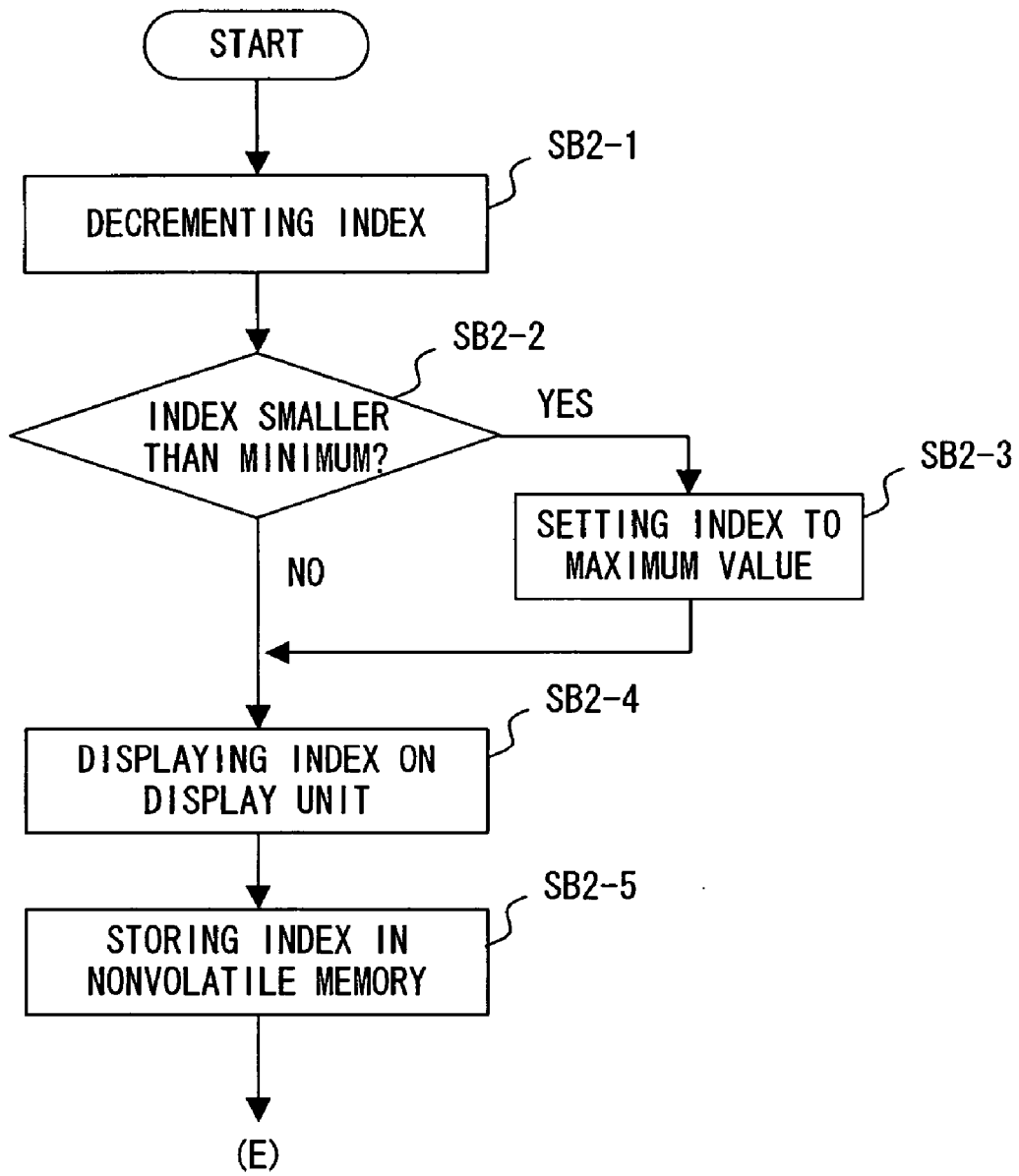
FIG. 14 is a flowchart showing the process performed when a decrement button 56-2b is operated (A2 shown in FIG. 11) according to the first embodiment of the present invention.

FIG. 14 is a flowchart of the process performed when the decrement button 56-2b is operated according to the present embodiment (A2 shown in FIG. 11). When the decrement button 56-2b is operated, the CPU 32-1 detects it and decrements the variable: index reserved in the RAM 32-3 (SB2-1).

index←index−1

This variable: index is the storage No. of the stop position direction table 90 shown in FIG. 12. That is, the variable: index indicates the target data when the storage button 56-2c and the recovery button 56-2d described later are operated.

According to the present embodiment, the storage No. can be 16 values, that is, 0 through 15. When the index is smaller than the minimum value of 0 (YES in SB2-2), the index is set to the maximum value of 15 (SB2-3). When the index is smaller than the minimum value of 0 (NO in SB2-2), control is passed to the next process.

The CPU 32-1 displays the index value on the display unit 56-1 (SB2-4). Thus, the operator can be informed of a target storage No., and then the CPU 32-1 stores the index in the nonvolatile memory 32-4 (SB2-5).

Figure 15:
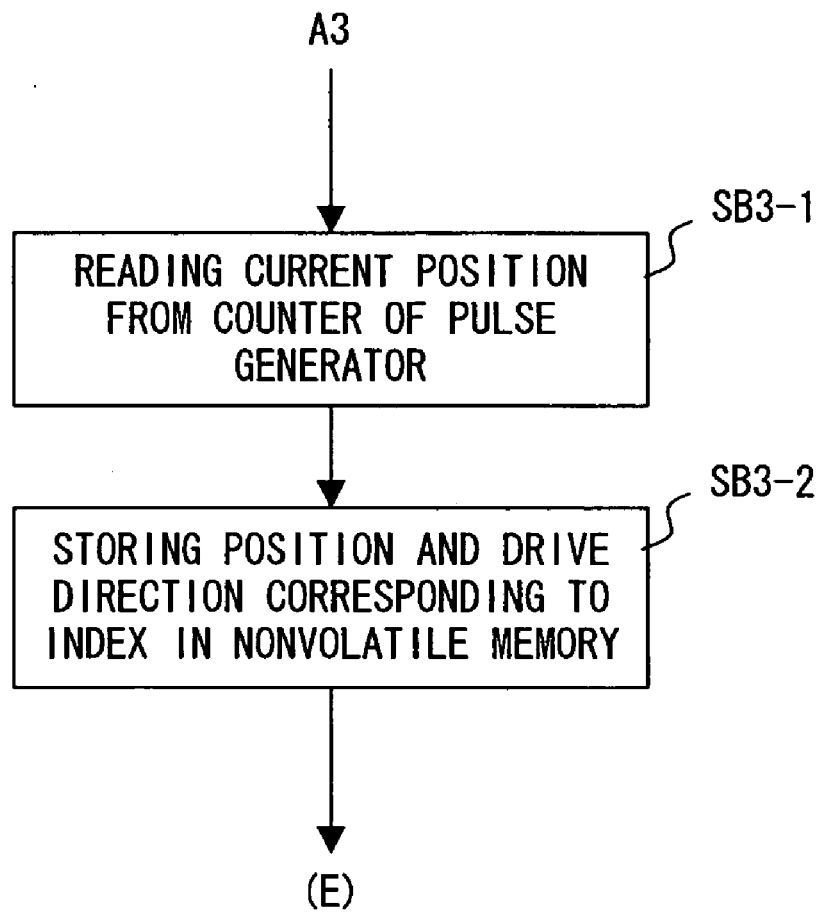
FIG. 15 is a flowchart showing the process performed when a storage button 56-2c is operated (A3 shown in FIG. 11) according to the first embodiment of the present invention.

FIG. 15 is a flowchart of the process performed when the storage button 56-2c is operated according to the present embodiment (A3 shown in FIG. 11). First, the current position is read from the counter of the pulse generator (SB3-1). In this embodiment, when the CPU 32-1 detects the operation on the storage button 56-2c, the positions (in pulse unit) are read from the X and Y counters, and written and stored in the X axis position and the Y axis position of the stop position direction table 90. (FIG. 12) reserved in the nonvolatile memory 32-4 and pointed to by the current index.

Then, corresponding to the index, the position and the drive direction are stored in the nonvolatile memory (SB3-2). In this embodiment, the dir_X and dir_Y stored in another location in the nonvolatile memory 32-4 are read, and written and stored in the X axis stop direction and the Y axis stop direction in the stop position direction table 90 (FIG. 12) reserved in the nonvolatile memory 32-4 and pointed to by the current index.

FIG. 16 shows an example of an updated stop position direction table 90 according to the present embodiment. In the present embodiment, for example, when the index is 6, the X counter is 2000, the Y counter is 50000, dir_X is −1, and dir_Y is −1, the stop position direction table 90 stores the values as shown in FIG. 16.

Figure 17:
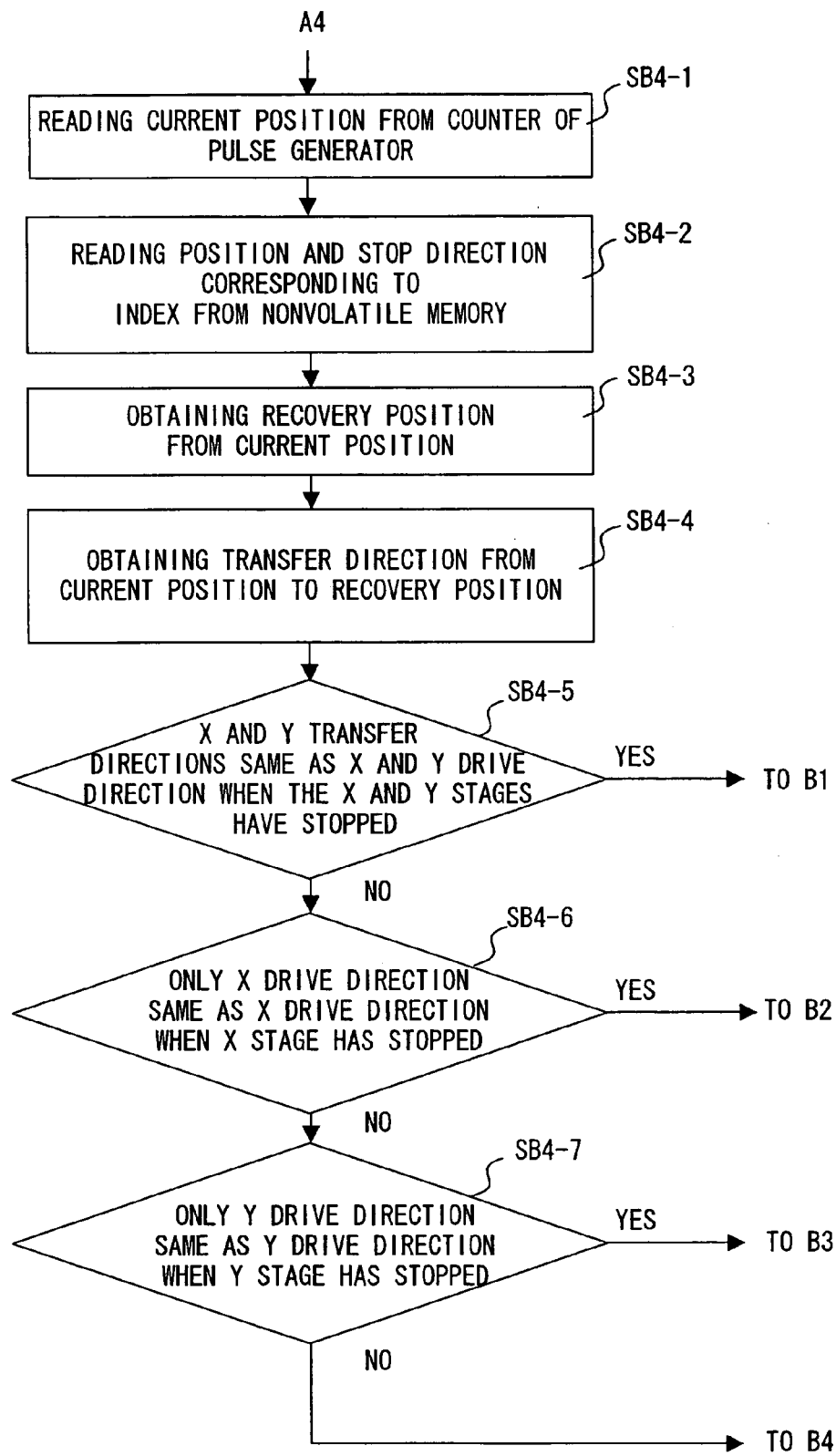
FIG. 17 is a flowchart showing the process performed when a recovery button 56-2d is operated (A4 shown in FIG. 11) according to the first embodiment of the present invention.

FIG. 17 is a flowchart of the process performed when the recovery button 56-2d is operated (A4 shown in FIG. 11) according to the present embodiment. The outline of the process is described below. That is, when the CPU 32-1 detects the operation on the recovery button 56-2d, it performs a recovery transfer to the position indicated by the current index of the stop position direction table 90 reserved in the nonvolatile memory 32-4 in the matching stop direction.

First, the current position is read from the counter of the pulse generator (SB4-1). The CPU 32-1 reads the current position from the counter X, and stores it in the variable now_X reserved in the RAM 32-3. The CPU 32-1 reads the current position from the counter Y, and stores it in the variable now_Y reserved in the RAM 32-3.

Then, it reads the position corresponding to the index and the drive direction when the X and Y stages have stopped from the stop position direction table 90 of the nonvolatile memory (SB4-2). The CPU 32-1 reads the X position indicated by the current index of the stop position direction table 90 reserved in the nonvolatile memory 32-4, and stores it in the variable dst_X reserved in the RAM 32-3. The CPU 32-1 reads the Y position indicated by the current index of the stop position direction table 90 reserved in the nonvolatile memory 32-4, and stores it in the variable dst_Y reserved in the RAM 32-3.

Furthermore, the CPU 32-1 reads the X axis stop direction indicated by the current index of the stop position direction table 90 reserved in the nonvolatile memory 32-4, and stores it in the variable last_dir_X reserved in the RAM 32-3. The CPU 32-1 reads the Y axis stop direction indicated by the current index of the stop position direction table 90 reserved in the nonvolatile memory 32-4, and stores it in the variable last_dir_Y reserved in the RAM 32-3.

Then, the amount of transfer from the current position to the recovery position is obtained (SB4-3). The CPU 32-1 obtains the amount of X axis transfer pulse_X. The amount of X axis transfer is obtained by subtracting the current X position from the X recovery position.

signed variable reserved in the RAM 32-3 pulse_$X \leftarrow dst\_X - now\_X$

The CPU 32-1 obtains pulse_Y. The amount of Y axis transfer is obtained by subtracting the current Y position from the Y recovery position signed variable reserved in the RAM 32-3 pulse_$Y \leftarrow dst\_Y - now\_Y$

Then, the transfer direction from the current position to the recovery position is obtained (SB4-4). The CPU 32-1 obtains the direction of the X axis recovery transfer. The direction of the X axis recovery transfer is obtained by checking the sign of the pulse_X. If the pulse_X is positive, it indicates the direction off the origin sensor. If the pulse_X is negative, it indicates the direction toward the origin sensor.

The CPU 32-1 obtains the direction of the Y axis recovery transfer. The direction of the Y axis recovery transfer can be obtained by checking the sign of pulse_Y. If the pulse_Y is positive, it indicates the direction off the origin sensor. If the pulse_Y is negative, it indicates the direction toward the origin sensor.

Then, it is determined whether of not the X and Y transfer directions match the X and Y drive directions when the X and Y stages have stopped (SB4-5). In this embodiment, it is determined whether or not pulse_X and last_dir_X are assigned the same signs, and the pulse_Y and last_dir_Y are assigned the same signs. If the conditions are satisfied (YES in SB4-5), then control is passed to the process B1. Otherwise (NO in SB4-5), control is passed to the process SB4-6.

It is determined whether or not only the X drive direction matches the X drive direction when the X stage has stopped (SB4-6). In this example, pulse_X and last_dir_X are assigned the same signs. If this condition is satisfied (YES in SB4-6), control is passed to the process B2. Otherwise (NO in SB4-6), control is passed to the process SB4-7.

It is determined whether or not only the Y drive direction matches the Y drive direction when the Y stage has stopped (SB4-7). In this example, pulse_Y and last_dir_Y are assigned the same signs. If this condition is satisfied (YES in SB4-7), control is passed to the process B3. Otherwise (NO in SB4-7), control is passed to the process B4.

For example, when the current position now_X is 1000, now_Y is 20000, the index is 6, the recovery position dst_X is 2000, dst_Y is 50000, the stop direction last_dir_X is −1, and last_dir_Y is −1 while pulse_X is 1000 and pulse_Y is 30000. Therefore, the X axis and the Y axis are different in stop direction from the recovery direction, the determinations in SB4-5, SB4-6, and SB4-7 are NO, thereby passing control to the process B4.

Figure 18:
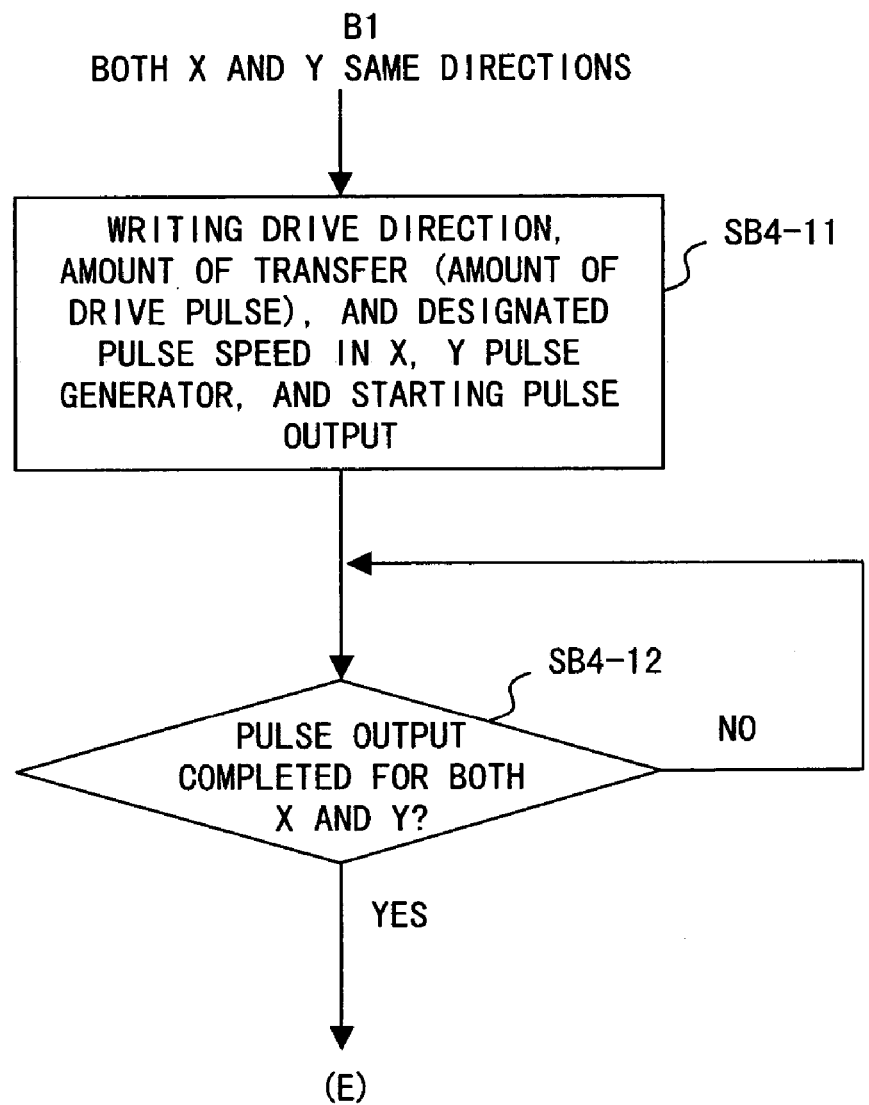
FIG. 18 shows a transfer process (B1 shown in FIG. 17) of a movable member 11 when the X and Y transfer directions are the same as the X and Y drive directions in the stop state according to the first embodiment of the present invention.

FIG. 18 shows the transfer process (B1 shown in FIG. 17) of the movable member 11 when the X and Y transfer directions match the X and Y drive directions when the X and Y stages have stopped according to the present embodiment. First, the drive direction, the amount of transfer (number of drive pulses), and the designated pulse speed are written to the X and Y pulse generators, and the output of the pulse is started (SB4-11).

In the explanation below, the pulse output from the X pulse generator is referred to as X pulse output, and the pulse output from the Y pulse generator is referred to as Y pulse output. The output pulses are respectively referred to X pulses and Y pulses. Until the X and Y pulse output is completed, the CPU 32-1 enters a standby state (NO in SB4-12). When the pulse output is completed, the process B1 terminates (YES in SB4-12).

FIG. 19 shows a recovery operation realized by the process shown in FIG. 18 according to the present embodiment. FIG. 19 shows a screen image (the sample image portion is omitted here) of the sample 2 displayed on the display unit of the Host 70. For example, assume that the point P1 (dst_X, dst_Y) is the position stored by the joy stick operation for recovery, and the point P0 (now_X, now_Y) is the current position.

The recovery to the position P1 refers to operating the movable member 11 to display a sample on the display unit of the host with the P1 set at the center. The current position P0 indicates a sample displayed on the display unit of the host with the current P0 set at the center.

The point P1 is considered to stop with the system facing upper right (X axis direction as a direction off the origin sensor, and Y axis direction as a direction off the origin sensor) when data is stored. In this case, the approach in the similar direction to the stopping operation when data is stored makes recovery from P0 to P1.

Figure 20:
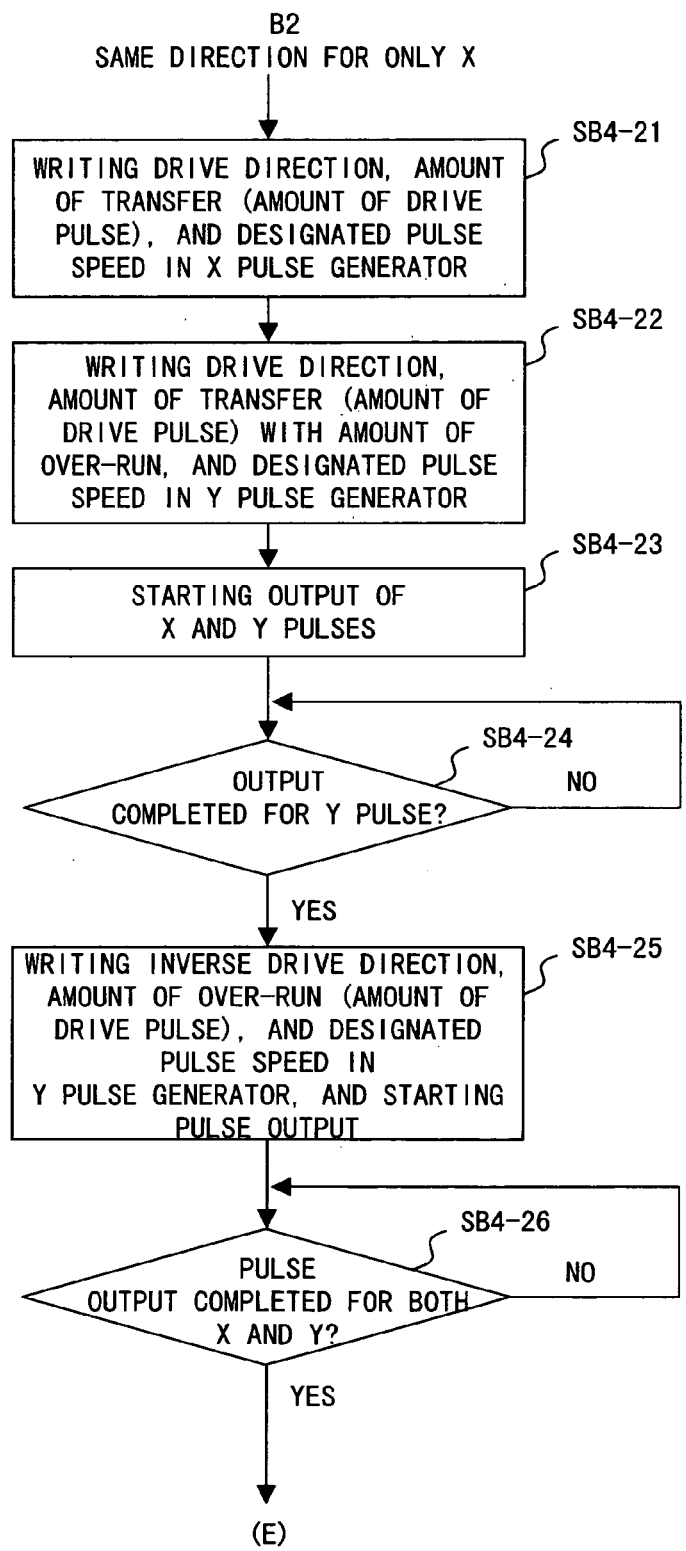
FIG. 20 shows a transfer process (B2 shown in FIG. 17) of a movable member 11 when only the X transfer direction is the same as the X drive direction in the stop state according to the first embodiment of the present invention.

FIG. 20 shows the transfer process (process B2 shown in FIG. 17) of the movable member 11 when only the X transfer direction matches the X drive direction when the X stage has stopped according to the present embodiment. First, the drive direction, the amount of transfer (number of drive pulses), and the designated pulse speed are written to the X pulse generator (SB4-21).

Then, the drive direction, the amount of transfer including an amount of over-run (number of drive pulses), and the designated pulse speed are written to the Y pulse generator (SB4-22). In this embodiment, the CPU 32-1 first reads the amount of Y axis over-run (pulse unit) from the nonvolatile memory 32-4. The amount of Y axis over-run refers to the amount passing the Y recovery position of dst_Y in the direction off the origin.

The CPU 32-1 writes the drive direction and the amount of transfer with the amount of Y axis over-run added to the pulse_Y as an amount of transfer to the Y pulse generator 32-7. For example, based on the amount of X axis over-run of 2, and pulse_X of 30000, the amount of transfer written to the pulse_X is pulse_X of 30002.

Then, the X and Y pulse output is started (SB4-23). In this embodiment, the CPU 32-1 writes the start of pulse output to the X pulse generator 32-5, and starts recovery transfer of the X axis stage. The CPU 32-1 writes the start of pulse output to the Y pulse generator 32-7, thereby starting the recovery transfer.

Then, it is determined whether or not the output of Y pulses has been completed (SB4-24). Until the output of Y pulses is completed, the CPU 32-1 enters the standby state (NO in SB4-24). When the output of pulses is completed (YES in SB4-24), control is passed to SB4-25. Then, the inverse drive direction, the amount of over-run (number of drive pulses), and the designated pulse speed are written to the Y pulse generator, thereby starting the output of pulses (SB4-25). If the Y axis stage stops after passing the recovery position, the CPU 32-1 detects it through the Y pulse generator 32-7.

The CPU 32-1 writes the drive direction of last_dir_Y of −1 as the direction toward the origin, the number of drive pulses as the amount of Y axis over-run, and the predetermined pulse speed at recovery to the Y pulse generator 32-7, and also the start of the pulse output, thereby starting the transfer of the Y axis stage.

Then, it is determined whether or not the output of X and Y pulses has been completed (SB4-26). When the CPU 32-1 detects the completion of the output of X pulses and the completion of the output of Y pulses through the X pulse generator 32-5 and the control unit 32, that is, the stop of the X axis stage and the stop of the Y axis stage, it completes the process of the recovery button 56-2d (end of S1-5 shown in FIG. 7), thereby returning control to the detection (S1-2) of the joy stick 56-3.

Figure 21:
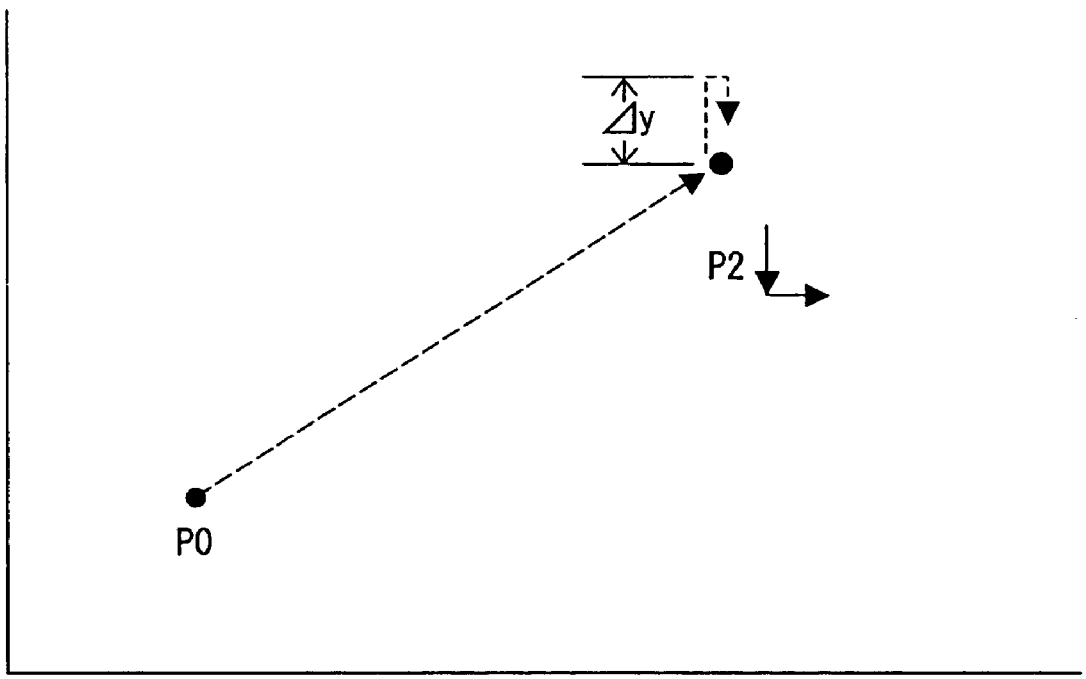
FIG. 21 shows a recovery operation realized by the process shown in FIG. 20 according to the first embodiment of the present invention.

FIG. 21 shows the recovery operation realized by the process shown in FIG. 20 according to the present embodiment. FIG. 21 shows the configuration similar to that shown in FIG. 19. In FIG. 21, P0 (now_X, now_Y) indicates the current position, P2 (dst_X, dst_Y) indicates the recovery position, and Δy indicates the amount of Y axis over-run. The point P2 is considered to stop with the system facing downwards (Y axis direction as a direction toward the origin sensor) when data is stored. In this case, for recovery from P0 to P2 with the approach in the similar direction to the stopping operation when data is stored, Δy excess transfer is performed in the Y axis direction, and then a return is made by Δy.

Figure 22:
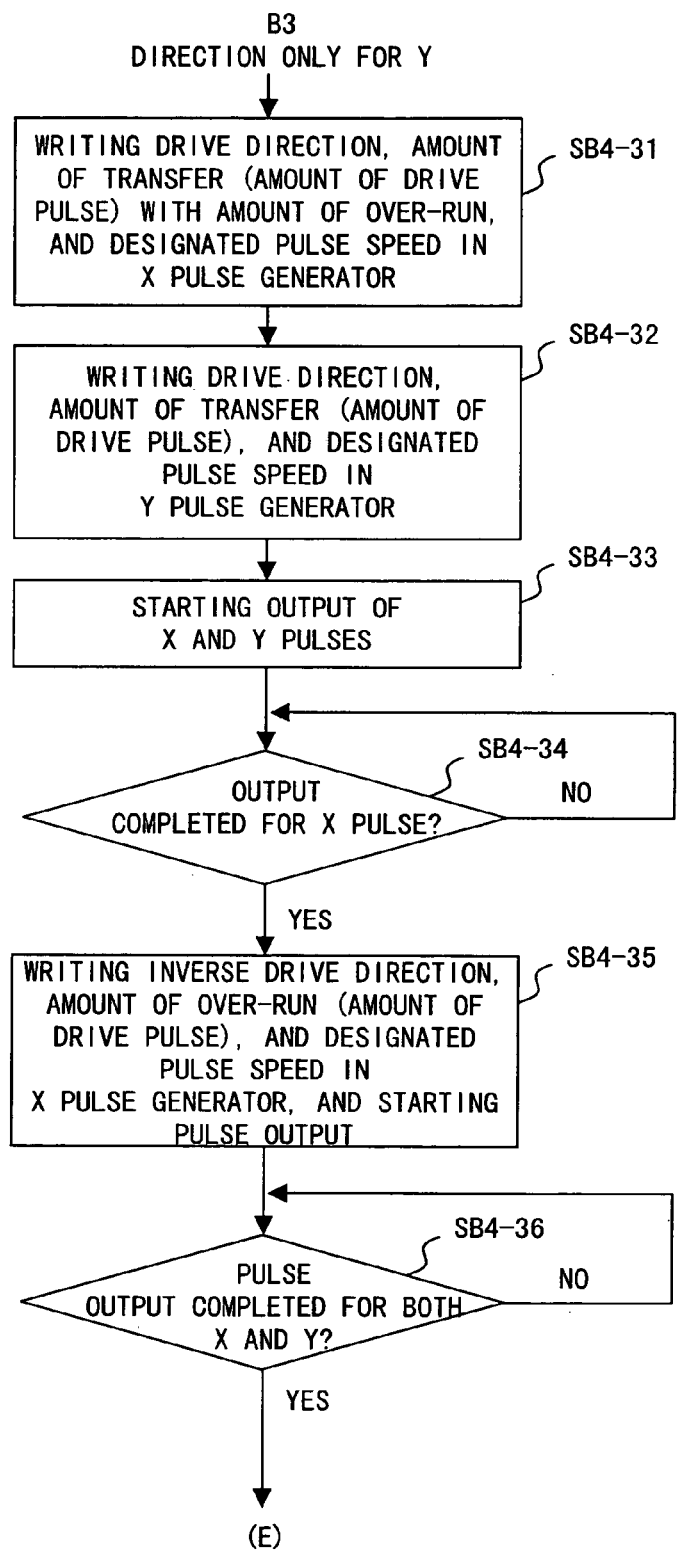
FIG. 22 shows a transfer process (B3 shown in FIG. 17) of a movable member 11 when only the Y transfer direction is the same as the Y drive direction in the stop state according to the first embodiment of the present invention.

FIG. 22 shows the transfer process (process of B3 shown in FIG. 17) of the movable member 11 when only the Y transfer direction matches the Y drive direction when the Y stage has stopped. First, the drive direction, the amount of transfer including the amount of over-run (number of drive pulses), and the designated pulse speed are written to the X pulse generator (SB4-31). In this example, the CPU 32-1 reads the amount of X axis over-run (in a pulse unit) from the nonvolatile memory 32-4. The amount of X axis over-run refers to the amount passing the X recovery position of dst_X in the direction off the origin.

The CPU 32-1 writes the drive direction and the amount of transfer with the amount of X axis over-run added to the pulse_X as an amount of transfer to the X pulse generator 32-5. For example, based on the amount of X axis over-run of 2, and pulse_X of 1000, the amount of transfer written to the pulse_X is pulse_X of 1002.

Then, the drive direction, the amount of transfer (number of drive pulses), and the designated pulse speed are written to the Y pulse generator (SB4-32).

In SB4-33, outputs of X pulse and Y pulse are started. Until the completion of the output of X pulses, the CPU 32-1 enters the standby state (NO in SB4-34). When the output of X pulses is completed (YES SB4-34), control is passed to SB4-25.

Then, the inverse drive direction, the amount of over-run (number of drive pulses), and the designated pulse speed are written to the X pulse generator, thereby starting the output of pulses (SB4-35). When the X axis stage stops after passing the recovery position, the CPU 32-1 detects it through the X pulse generator 32-5.

The CPU 32-1 writes the drive direction of last_dir_X of −1 as the direction toward the origin, the number of drive pulses as the amount of X axis over-run, and the predetermined pulse speed at recovery to the X pulse generator 32-5, and also the start of the pulse output, thereby starting the transfer of the X axis stage.

Then, it is determined whether or not the output of X and Y pulses has been completed (SB4-36). When the CPU 32-1 detects the completion of the output of X pulses and the completion of the output of Y pulses through the X pulse generator 32-5 and Y pulse generator 32-7, that is, the stop of the X axis stage and the stop of the Y axis stage, it completes the process of the recovery button 56-2*d* (end of S1-5 shown in FIG. 7), thereby returning control to the detection (S1-2) of the joy stick 56-3.

Figure 23:
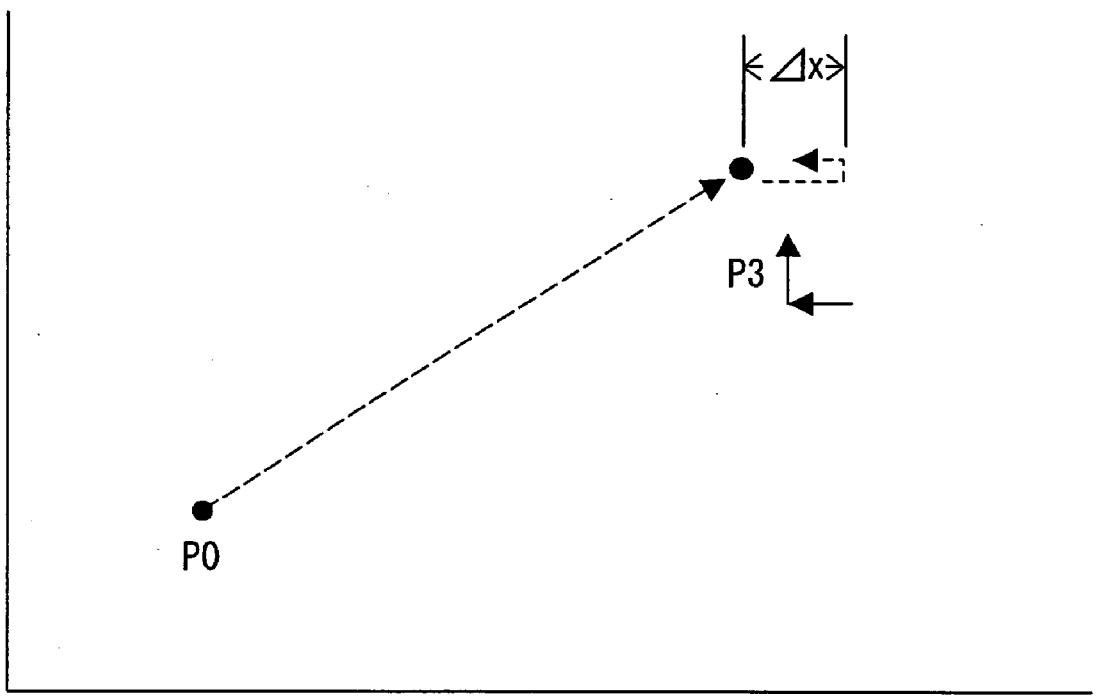
FIG. 23 shows a recovery operation realized by the process shown in FIG. 22 according to the first embodiment of the present invention.

FIG. 23 shows the recovery operation realized by the process shown in FIG. 22 according to the present embodiment. FIG. 23 shows the configuration similar to that shown in FIG. 19. In FIG. 23, P0 (now_X, now_Y) indicates the current position, P3 (dst_X, dst_Y) indicates the recovery position, and Δx indicates the amount of X axis over-run. The point P3 is considered to stop with the system facing left (Y axis direction as a direction toward the origin sensor) when data is stored. In this case, for recovery from P0 to P2 with the approach in the similar direction to the stopping operation when data is stored, Δx excess transfer is performed in the X axis direction, and then a return is made by Δx.

Figure 24:
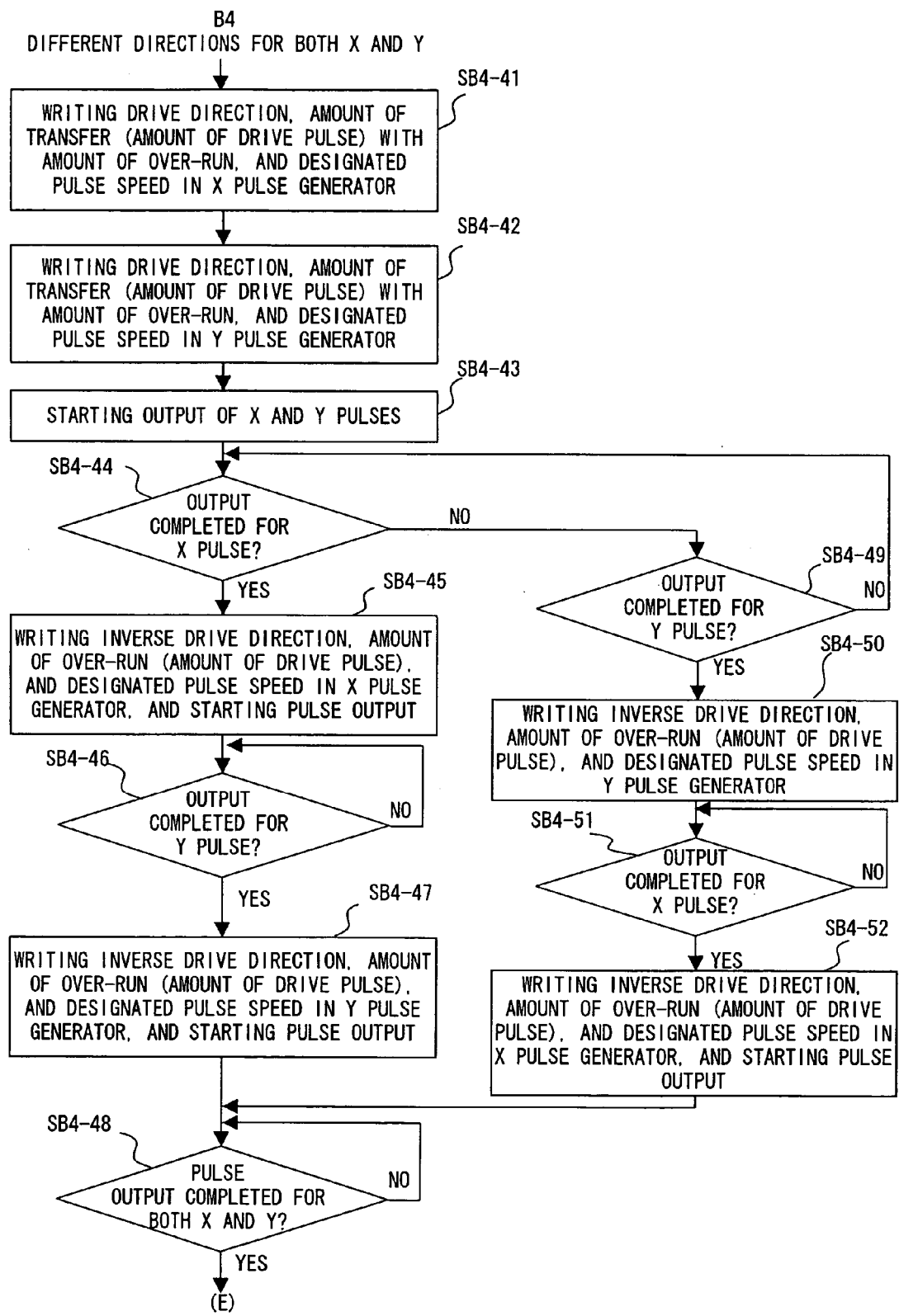
FIG. 24 shows a transfer process (B4 shown in FIG. 17) of a movable member 11 when the X and Y transfer directions are different from the drive directions in the stop state according to the first embodiment of the present invention.

FIG. 24 shows the transfer process (process of B4 shown in FIG. 17) of the movable member 11 when both X and Y transfer directions do not match the drive direction when the X and Y stages have stopped. First, the drive direction, the amount of transfer including the amount of over-run (number of drive pulses), and the designated pulse speed are written to the X pulse generator (SB4-41). The CPU 32-1 reads the amount of X axis over-run (in a pulse unit) from the nonvolatile memory 32-4. The amount of X axis over-run refers to the amount passing the X recovery position of dst_X in the direction off the origin.

The CPU 32-1 writes the drive direction and the amount of transfer with the amount of X axis over-run added to the pulse_X as an amount of transfer to the X pulse generator 32-5. For example, based on the amount of X axis over-run of 2, and pulse_X of 1000, the amount of transfer written to the pulse_X is pulse_X of 1002.

The drive direction, the amount of transfer including the amount of over-run (number of drive pulses), and the designated pulse speed are written to the Y pulse generator (SB4-42). The CPU 32-1 reads the amount of Y axis over-run (in a pulse unit) from the nonvolatile memory 32-4. The amount of Y axis over-run refers to the amount passing the Y recovery position of dst_Y in the direction off the origin.

The CPU 32-1 writes the drive direction and the amount of transfer with the amount of Y axis over-run added to the pulse_Y as an amount of transfer to the Y pulse generator 32-7. For example, based on the amount of Y axis over-run of 2, and pulse_Y of 30000, the amount of transfer written to the pulse_Y is pulse_Y of 30002.

Then, the X and Y pulse output is started (SB4-43). In this embodiment, the CPU 32-1 writes the start of pulse output to the X pulse generator 32-5, and starts recovery transfer of the X axis stage. The CPU 32-1 writes the start of pulse output to the Y pulse generator 32-7, thereby starting the recovery transfer of the Y axis stage.

Then, it is determined whether or not the output of X pulses has been completed (SB4-44). If the output of X pulses has been completed, control is passed to SB4-45. If the output of X pulses has not been completed, control is passed to SB4-49.

If YES in SB4-44, the inverse drive direction, the amount of over-run (number of drive pulses), and the designated pulse speed are written to the X pulse generator, thereby starting the output of pulses (SB4-45). When the X axis stage stops after passing the recovery position, the CPU 32-1 detects it through the X pulse generator 32-5. The CPU 32-1 writes the drive direction of last_dir_X of −1 as the direction toward the origin, the number of drive pulses as the amount of X axis over-run, and the predetermined pulse speed at recovery to the X pulse generator 32-5, and also the start of the pulse output, thereby starting the transfer of the X axis stage.

Then, it is determined whether or not the output of Y pulses has been completed (SB4-46). Until the output of Y pulses is completed, the CPU 32-1 enters the standby state (NO in SB4-46). When the output of pulses is completed (YES in SB4-46), control is passed to SB4-47.

Then, the inverse drive direction, the amount of over-run (number of drive pulses), and the designated pulse speed are written to the Y pulse generator, thereby starting the output of pulses (SB4-47). If the Y axis stage stops after passing the recovery position, the CPU 32-1 detects it through the Y pulse generator 32-7. The CPU 32-1 writes the drive direction of last_dir_Y of −1 as the direction toward the origin, the number of drive pulses as the amount of Y axis over-run, and the predetermined pulse speed at recovery to the Y pulse generator 32-7, and also the start of the pulse output, thereby starting the transfer of the Y axis stage.

Described below is the process when the answer is NO in SB4-44. In this case, it is determined whether or not the output of Y pulses has been completed (SB4-49). If the output of Y pulses has not been completed, then control is returned to SB4-44 (NO in SB4-49). If the output of Y pulses has been completed (YES in SB4-49), then control is passed to SB4-50.

Then, the inverse drive direction, the amount of over-run (number of drive pulses), and the designated pulse speed are written to the Y pulse generator (SB4-50). If the Y axis stage stops after passing the recovery position, the CPU 32-1 detects it through the Y pulse generator 32-7. The CPU 32-1 writes the drive direction of last_dir_Y of −1 as the direction toward the origin, the number of drive pulses as the amount of Y axis over-run, and the predetermined pulse speed at recovery to the Y pulse generator 32-7, and also the start of the pulse output, thereby starting the transfer of the Y axis stage.

Then, it is determined whether or not the output of Y pulses has been completed (SB4-51). Until the output of Y pulses is completed, the CPU 32-1 enters the standby state (NO in SB4-51). When the output of pulses is completed (YES in SB4-51), control is passed to SB4-52.

The inverse drive direction, the amount of over-run (number of drive pulses), and the designated pulse speed are written to the X pulse generator, thereby starting the output of pulses (SB4-52). If the X axis stage stops after passing the recovery position, the CPU 32-1 detects it through the X pulse generator 32-5. The CPU 32-1 writes the drive direction of last_dir_X of −1 as the direction toward the origin, the number of drive pulses as the amount of X axis over-run, and the predetermined pulse speed at recovery to the X pulse generator 32-5, and also the start of the pulse output, thereby starting the transfer of the X axis stage.

When the process in SB4-47 or SB4-52 is completed, it is determined whether or not the output of X and Y pulses has been completed (SB4-48). When the CPU 32-1 detects the completion of the output of X pulses and the completion of the output of Y pulses through the X pulse generator 32-5 and the X pulse generator 32-7, that is, the stop of the X axis stage and the stop of the Y axis stage, it completes the process of the recovery button 56-2*d* (end of S1-5 shown in FIG. 7), thereby returning control to the detection (S1-2) of the joy stick 56-3.

Figure 25:
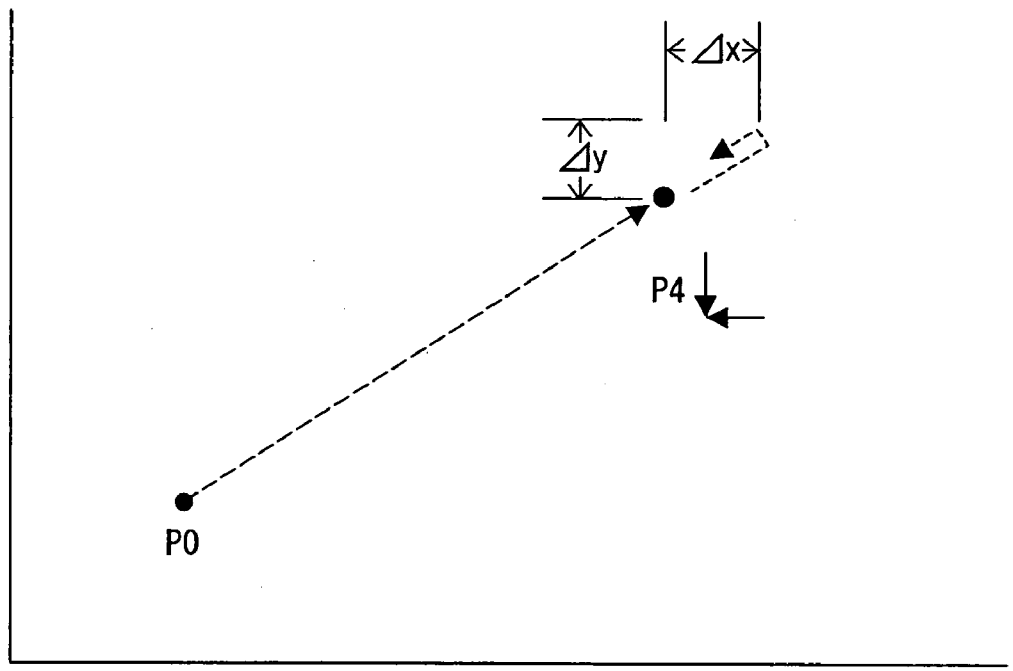
FIG. 25 shows a recovery operation realized by the process shown in FIG. 24 according to the first embodiment of the present invention.

FIG. 25 shows the recovery operation realized by the process shown in FIG. 24 according to the present embodiment. FIG. 25 shows the configuration similar to that shown in FIG. 19. In FIG. 25, P0 (now_X, now_Y) indicates the current position, P4 (dst_X, dst_Y) indicates the recovery position, and Δy indicates the amount of Y axis over-run. The point P4 is considered to stop with the system facing lower left (X axis direction as a direction toward the origin sensor, and Y axis direction as a direction toward the origin sensor) when data is stored. In this case, for recovery from P0 to P4 with the approach in the similar direction to the stopping operation when data is stored, Δx excess transfer is performed in the X axis direction, and then a return is made by Δx, and further Δy excess transfer is performed in the Y axis direction, and then a return is made by Δy.

In SJ3 shown in FIG. 10, the configuration in which the pulse speed obtained from the operation angle is stored in the nonvolatile memory as in the case of the drive direction in SJ5 can be realized. The pulse speed indicates the transfer speed immediately before the drive is stopped, and the configuration in which the amount of over-run is adjusted by adjusting the transfer speed immediately before the stop in addition to the transfer direction at stop in the recovery operation to the storage position can also be realized.

As described above, an arbitrary point on a sample can be selected in operating a joy stick, and the X axis stop direction and the Y axis stop direction when the position is selected can also be stored together with the position by operating the storage button.

Additionally, in operating the recovery button, the X axis stop direction and the Y axis stop direction are controlled to match each other in the recovery operation to the storage position. Therefore, the influence of a lost motion due to a backlash, etc. can be eliminated.

As described above, the power stage can be recovered to the predetermined storage position with the influence of the lost motion taken into account. Similarly, the power stage can be recovered to the storage position by the approach in the storage direction.

<Second Embodiment>

The second embodiment controls the transfer amount error generated by the influence of the lost motion due to a backlash. The transfer amount error is explained below. When a power stage for a microscope starts its operation after activating the power stage, there necessarily is an error generated in time. Thus, the difference between the amount of transfer of the power stage for a microscope when there is no error in time (that is, there is no backlash), and the amount of transfer of the power stage for a microscope when there is an error in time (that is, there is a backlash) is referred to as a transfer amount error.

As compared with the first embodiment, the present embodiment is different only in an origin detection unit and a control unit, and other components are similar to those in the first embodiment. Therefore, only the different components are explained, and the explanation of the similar components is omitted here.

The control units 32 is provided with an external communications unit such as an RS-232C, a USB, the Ethernet, etc., and the CPU 32-1 receives a command from external equipment 70 (hereinafter referred to as a Host) through the I/F, thereby controlling the drive unit as operating it from the operation unit 56, and communicating information with external devices.

FIG. 26 shows a command set of the control unit 32 according to the present embodiment. A command name "ORG" (origin detecting operation command) refers to a command to transfer a stage to the origin designated by the origin sensor, and reset the position (coordinates). A command name "MOVERR?" (transfer amount error acquisition command) refers to a command to notify about the transfer amount errors err_X, err_Y.

The command name "POS?" (position acquisition command) refers to a command to notify about stage positions ax, ay. A command name "DIR?" (transfer stop direction acquisition command) is a command to notify of a transfer stop directions dir_X, dir_Y. A command name "MOVABS ax, ay" (transfer command) refers to a command to transfer a stage to an (absolute) position designated by ax and ay.

Described below is the operation of the power stage for a microscope according to the present embodiment.

Figure 27:
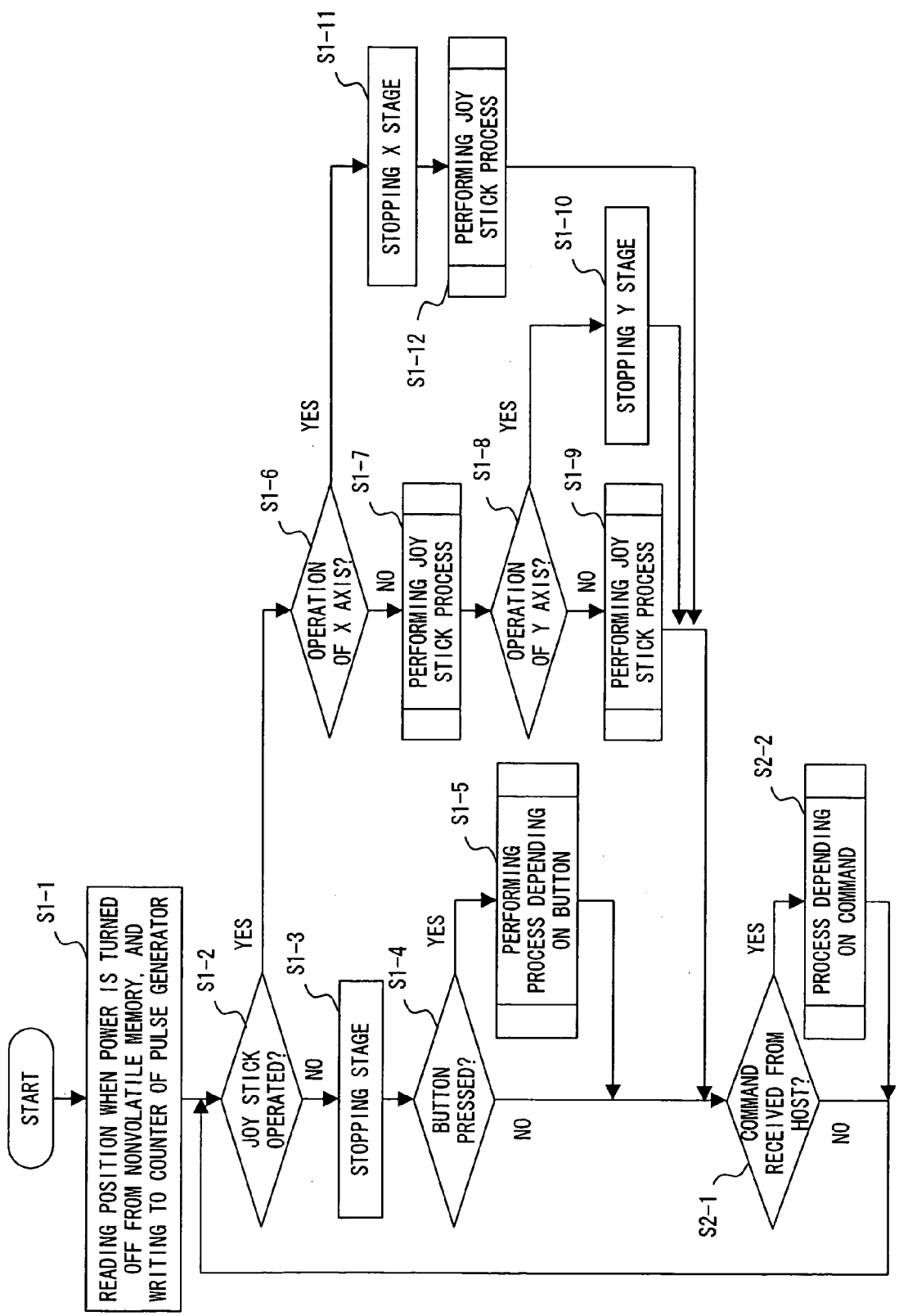
FIG. 27 is a flowchart showing the process of control to be performed in the operation of the operation unit according to the second embodiment of the present invention.

FIG. 27 is a flowchart of the process of the control generated by an operation of the operation unit according to the present embodiment. S1-1 to S1-12 are similar to those according to the first embodiment. Therefore, only the processes in S2-1 and S2-2 are explained here.

CPU 32-1 checks a received command from the Host, and performs the process according to the command (S2-2) if it is received (YES in S2-1). On the other hand, if no command is received from the Host (NO in S2-1), then control is returned to S1-2.

Figure 28:
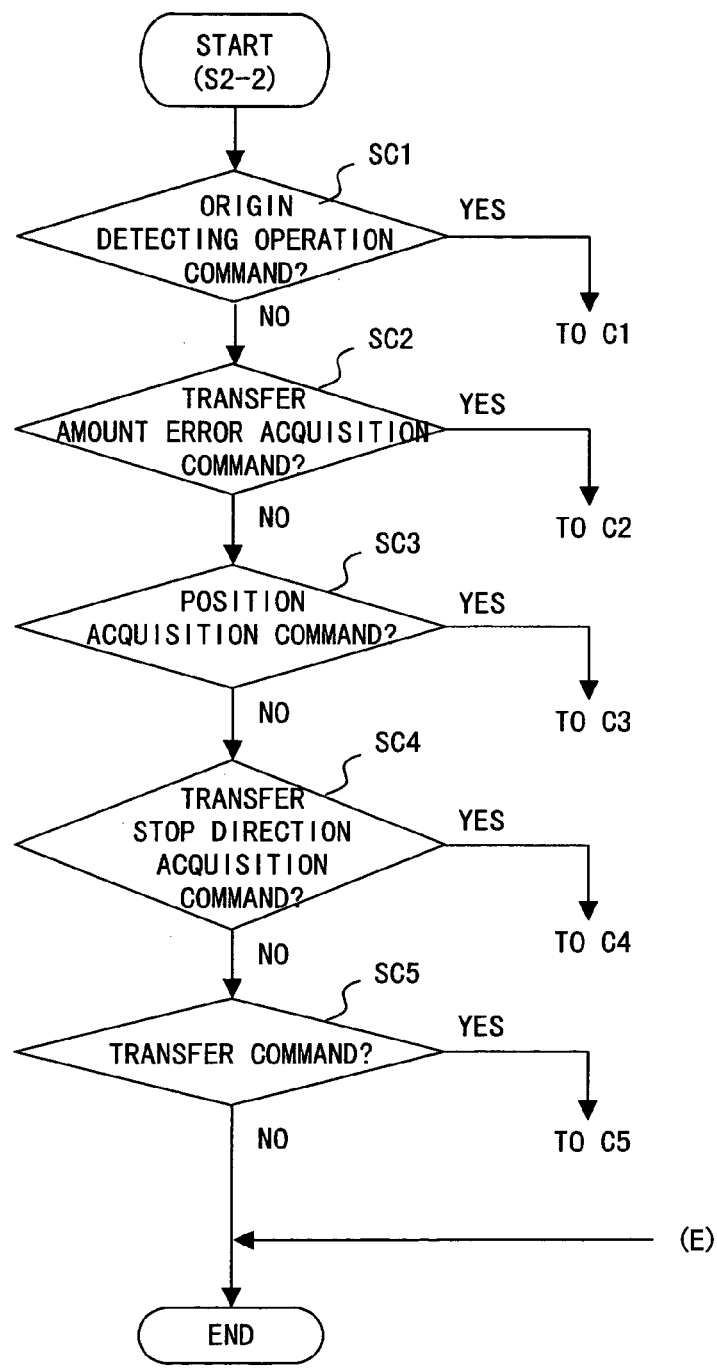
FIG. 28 is a flowchart of the process for performing the process (process of S2-2 shown in FIG. 27)) depending on each command according to the second embodiment of the present invention.

FIG. 28 is a flowchart of the processes (S2-2 shown in FIG. 27) depending on each command according to the present embodiment. If a received command is "ORG (origin detecting operation command)" (SC1), the subsequent process C1 is performed. If a received command is "MOVERR? (transfer amount error acquisition command)" (SC2), then the process C2 described later is performed. If a received command is a "POS? (position acquisition command)" (SC3), then the process C3 described later is performed. If a received command is "DIR? (transfer stop direction acquisition command)" (SC4) then the process 04 describe later is performed. If a received command is "MOVABS ax, ay (transfer command)" (SC5), then the process C5 described later is performed.

Figure 29:
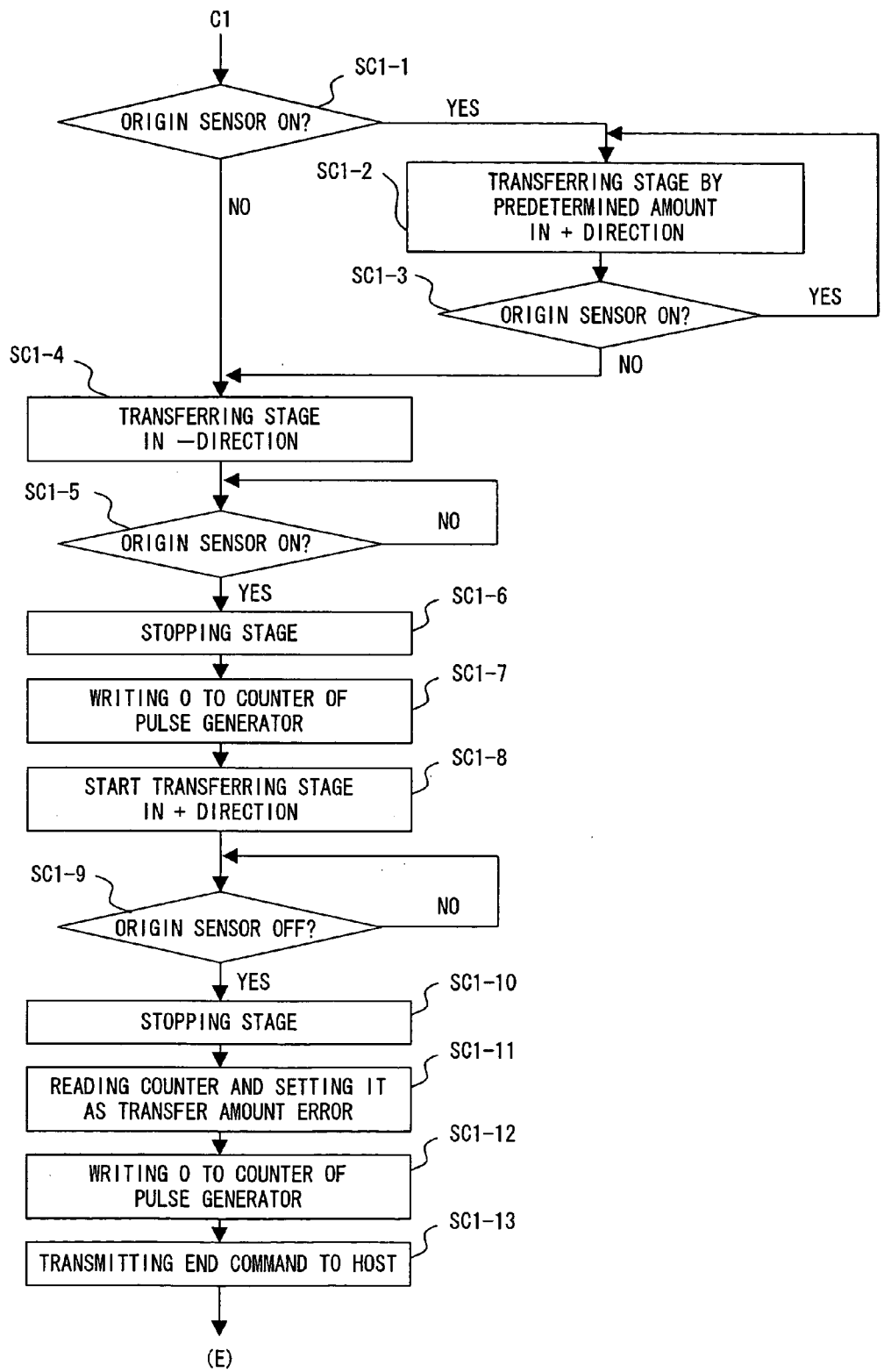
FIG. 29 is a detailed flowchart performed when an origin detecting operation command is received (process C1 shown in FIG. 28) according to the second embodiment of the present invention.

FIG. 29 is a detailed flowchart of the process performed when the origin detecting operation command according to the present embodiment is received (process C1 shown in FIG. 28). First, the CPU 32-1 reads a signal of the Y origin sensor 30. The signal of the Y origin sensor 30 indicates ON for the position cut off by the visor 31, that is, when the movable member 11 is located at the origin, and indicates OFF for the position not cut off by the visor 31, that is, when the movable member 11 is not located at the origin.

The CPU 32-1 determines whether or not the signal of the Y origin sensor 30 is ON (SC1-1). If the signal of the Y origin sensor 30 is OFF (NO in SC1-1), then control is passed to SC1-4.

If the CPU 32-1 determines that the signal of the Y origin sensor 30 is ON (YES in SC1-1), the Y stepping motor 20 is driven by a predetermined number of pulses (20 pulses) in the + direction, and the movable member 11 is transferred by 50 μm (=2.5 μm/p×20 p) in the + direction (SC1-2).

The CPU 32-1 reads the signal of the Y origin sensor 30 after 20 pulses have been completely output, and determines whether or not the signal of the Y origin sensor 30 is ON (SC1-3). If the signal is ON (YES in SC1-3), control is returned to step SC1-2, and the predetermined amount pulses is output again. Thus, the movable member 11 is transferred by 50 μm in the +direction until the signal is OFF. When the signal of the Y origin sensor 30 is OFF (NO in SC1-3), then control is passed to SC1-4.

Then, the CPU 32-1 starts driving the Y stepping motor 20 by a predetermined number of pulses (− pulse) in one direction, and starts transferring the movable member 11 in the direction (SC1-4). When the transfer stroke of the movable member 11 is, for example, 70 mm, the CPU 32-1 starts output of about 28000 pulses (=−700000 μm/2.5 μm/p). Thus, the movable member 11 starts moving in one direction, and the visor 31 approaches the Y origin sensor 30.

After starting the output of a predetermined number of pulses (− pulses) in one direction, the CPU 32-1 reads a signal of the Y origin sensor 30, and determines whether or not the signal of the Y origin sensor 30 is ON (SC1-5). If the signal of the Y origin sensor 30 is ON, control is passed to SC1-6. On the other hand, if the signal of the Y origin sensor 30 is OFF, then a signal of the Y origin sensor 30 is read again. While the signal is OFF, the above-mentioned process is repeated (NO in SC1-5).

When the signal of the Y origin sensor 30 is ON, the CPU 32-1 immediately suspends the output of pulses to the Y stepping motor 20, and stop the movable member 11 (SC1-6).

Thus, the visor 31 cuts off the light from the Y origin sensor 30, the movable member 11 is located in the place where the signal of the Y origin sensor 30 is ON, and the first half of the origin detecting operation terminates.

Then, the CPU 32-1 writes 0 to the Y counter 32-7-1 of the Y pulse generator 32-7, and clears the counter (SC1-7).

Then, the CPU 32-1 starts driving the movable member 11 in the + Y axis direction (off the origin) at a low speed (SC1-8).

The CPU 32-1 reads a signal of the Y origin sensor 30 after starting the output of a predetermined number of pulses (+ pulses) in the + Y axis direction, and determines whether or not the signal of the Y origin sensor 30 is ON (SC1-9). When the signal of the Y origin sensor 30 is ON (NO in SC1-9), the signal of the Y origin sensor 30 is read. While the signal is ON, the above-mentioned process is repeated.

On the other hand, when the signal of the Y origin sensor 30 is OFF (YES in SC1-9), the CPU 32-1 immediately suspends the output of pulses to the Y stepping motor 20, and stops the movable member 11 (SC1-10).

Then, the CPU 32-1 reads the counter value from the Y counter 32-7-1 of the Y pulse generator 32-7, and stores the value as a variable holding the Y axis transfer amount error in the variable err_Y reserved in the RAM 32-3 (SC1-11).

Then, the CPU 32-1 writes 0 to the Y counter 32-7-1 of the Y pulse generator 32-7, and clears the counter (SC1-12).

The CPU 32-1 performs the processes in SC1-1 through SC1-12 on the X axis as it performs on the Y axis, and stores the X axis transfer amount error in the variable err_X reserved in the RAM 32-3 (SC1-1 to SC1-12).

The completion command of the origin detecting operation is transmitted to the Host (SC1-13), and the process of the origin detecting operation command terminates.

FIG. 30 is a detailed flowchart of the process (C2 shown in FIG. 28) performed when the transfer amount error acquisition command is received according to the present embodiment. First, when the CPU 32-1 receives a transfer amount error acquisition command, it reads a variable err_X reserved in the RAM 32-3 as a variable holding a X axis transfer amount error, and a variable err_Y reserved in the RAM 32-3 as a variable holding a Y axis transfer amount error (SC2-1).

Then, it transmits a notification command having a transfer amount error as a parameter to the Host (SC2-2), thereby terminating the process of the transfer amount error acquisition command.

Thus, the Host can be informed of the transfer amount error by receiving the notification command. By obtaining a transfer amount error using the transfer amount error acquisition command, and by using the value for an amount of over-run, the cycle time of the transfer operation to any measurement point can be minimized.

Figure 31:
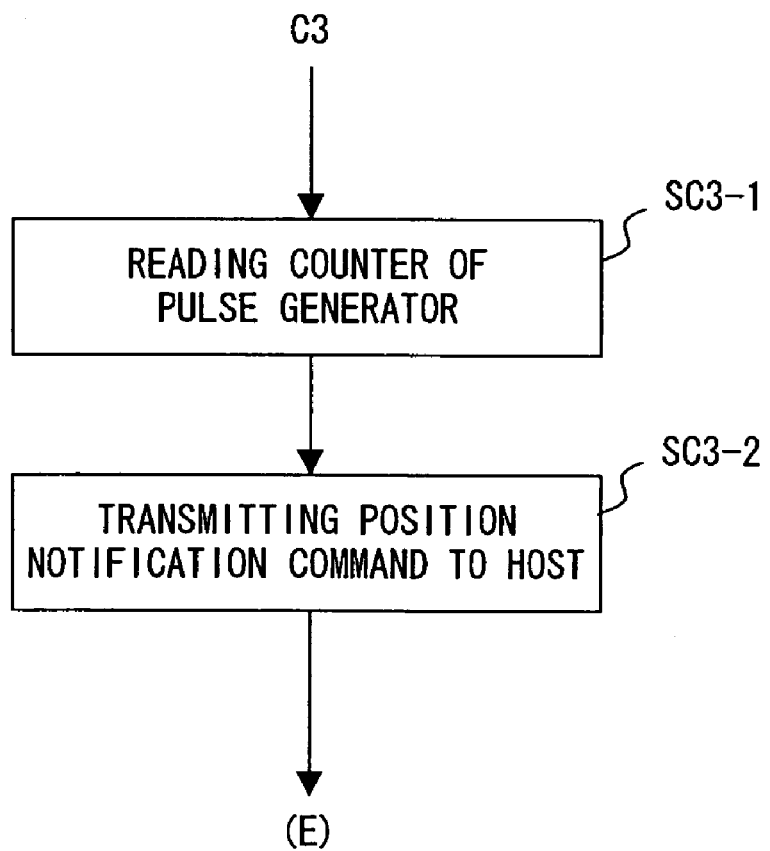
FIG. 31 is a detailed flowchart performed when a position acquisition command is received (process C3 shown in FIG. 28) according to the second embodiment of the present invention.

FIG. 31 is a detailed flowchart of the process (C3 shown in FIG. 28) performed when the position acquisition command is received according to the present embodiment. Upon receipt of the position acquisition command, the CPU 32-1 reads the current position from the counter X, and stores it in the variable now_X reserved in the RAM 32-2. The CPU 32-1 reads the current position from the counter Y, and stores it in the variable now_Y reserved in the RAM 32-3 (SC3-1).

Then, the CPU 32-1 transmits a notification command having now_X and now_Y as parameters holding the current position (SC3-2), thereby terminating the process of the position acquisition command.

Thus, the Host receives the notification command and can be informed of the position of the stage.

FIG. 32 is a detailed flowchart of the process (C4 shown in FIG. 28) performed when the transfer stop direction acquisition command is received according to the present embodiment. Upon receipt of the transfer stop direction acquisition command, the CPU 32-1 reads the signed variable dir_X reserved in the RAM 32-3 holding the X axis stop direction (last transfer direction) and the signed variable dir_Y reserved in the RAM 32-3 holding the Y axis stop direction (last transfer direction) (SC4-1).

Then, the CPU 32-1 transmits the notification command having the dir_X and dir_Y holding the Y axis stop direction (last transfer direction) as parameters (SC4-2), thereby terminating the process of the transfer stop direction acquisition command.

Thus, upon receipt of the notification command, the Host can be informed of the transfer stop direction of the stage.

Figure 33:
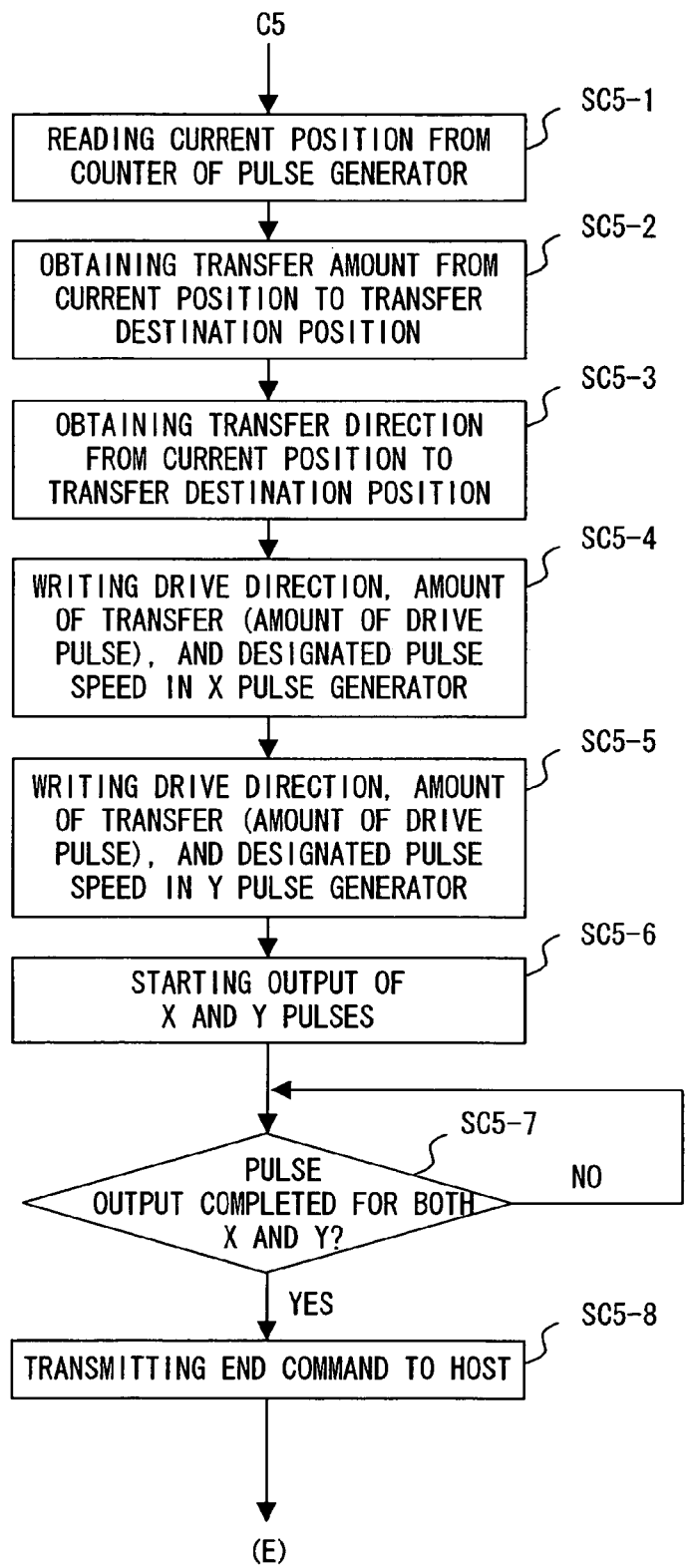
FIG. 33 is a detailed flowchart performed when a transfer command is received (process C5 shown in FIG. 28) according to the second embodiment of the present invention.

FIG. 33 is a detailed flowchart of the process (C5 shown in FIG. 28) performed when the transfer command is received according to the present embodiment. The outline of the process is explained below. When the CPU 32-1 detects the operation on the recovery button 56-2d, it performs a recovery transfer to the position indicated by the current index of the stop position direction table 90 reserved in the nonvolatile memory 32-4 such that the stop directions can match each other.

First, the current position is read from the counter of the pulse generator (SC5-1). Then, the amount of transfer from the current position to the destination position is obtained (SC5-2). Next, the drive direction from the current position to the destination position is obtained (SC5-3). Then, the drive direction, the amount of transfer (number of drive pulses), the designated pulse speed are written to the X pulse generator (SC5-4). Then, the drive direction, the amount of transfer (number of drive pulses), the designated pulse speed are written to the Y pulse generator (SC5-5).

The output of X and Y pulses is started (SC5-6). Then, the CPU 32-1 enters a standby state until the output of X and Y pulses is completed (NO in SC5-7). When the output of X and Y pulses is completed (YES in SC5-7), the completion command is transmitted to the Host (SC5-8), thereby terminating the process of the transfer command. The details of each of the processes in SC5-1 through SC5-7 are the same as those according to the first embodiment (refer to each process shown in FIG. 17).

Thus, upon receipt of the completion command, the Host can be informed of the completion of the transfer of a stage.

With the above-mentioned command set, a command according to the present embodiment is available from the application program for realizing a desired system on the Host. Therefore, the Host can obtain the position by a position acquisition command and the stop direction by a transfer stop direction acquisition command on the observation and measurement points selected in the joy stick operation. Therefore, when these positions are recovered and transferred, the current position can be obtained by the position acquisition command, an appropriate amount of over-run can be assigned, and the X axis stop direction and the Y axis stop direction can match each other using the transfer command. That is, the minimum amount of over-run can be used in performing a recovery operation in the shortest possible time.

Thus, according to the present embodiment as in the first embodiment, an influence of, for example, a backlash can be eliminated. Furthermore, since the present embodiment not necessarily requires a nonvolatile memory, thereby realizing a simpler and less expensive configuration.

As described above, a power stage can be recovered in the position stored in advance with an influence of a lost motion taken into account. Additionally, a power stage can be recovered in a stored position by the approach in the same direction as the storage time. In addition, the transfer amount error of a power stage due to a backlash at the current time can be obtained. Furthermore, recovery approach can be performed on the optimum condition and in the shortest possible time.

Thus, according to the present invention, when a desired position of a power stage for a microscope can be stored, and the power stage for a microscope is recovered in the position again, the power stage for a microscope can be recovered by the approach in the same direction as the storage time. As a result, an observation error due to a lost motion can be eliminated, and the system can be provided at a lower cost.

Furthermore, since a transfer amount error of a power stage for a microscope from an influence of a lost motion can be obtained, the above-mentioned approach can be realized on the optimum conditions.

What is claimed is:

1. A control system of a stage of a microscope, comprising:
    a stage transfer unit transferring the stage for loading a sample perpendicular to an optical axis of the microscope;
    a transfer command acquisition unit obtaining command information for a transfer of the stage;
    a stop position direction storage unit storing stop position direction information which is information generated according to the command information obtained from said transfer command acquisition unit, and the information about a position and direction when an operation of said stage transfer unit is stopped; and
    a stage transfer control unit controlling an operation of said stage transfer unit according to the stop position direction information stored in said stop position direction storage unit.

2. The system according to claim 1, wherein
    said stage transfer control unit controls said stage transfer unit such that, when the stage is transferred to the position and then stopped, the stage can be stopped in the same direction as the direction indicated by direction information in the stop position direction information.

3. The system according to claim 2, further comprising
    a transfer amount error acquisition unit obtaining an error between an amount of transfer of the stage transferred by said stage transfer unit and an amount of transfer of the stage indicated by control of said stage transfer control unit.

4. The system according to claim 3, wherein
    said stage transfer control unit controls said stage transfer unit based on the transfer amount error obtained from said transfer amount error acquisition unit.

5. The system according to claim 1, further comprising
    a transfer amount error acquisition unit obtaining an error between an amount of transfer of the stage transferred by said stage transfer unit and an amount of transfer of the stage indicated by control of said stage transfer control unit.

6. The system according to claim 5, wherein
    said stage transfer control unit controls said stage transfer unit based on the transfer amount error obtained from said transfer amount error acquisition unit.

7. A control apparatus of a stage of a microscope, comprising:
    an acquisition unit obtaining transfer information which is information for a transfer of the stage of the microscope having a stage for loading a sample perpendicular to an optical axis of the microscope;
    a stop position direction storage unit storing stop position direction information which is information generated according to the transfer information obtained by said acquisition unit when the transfer of the stage is stopped, and the information about the position and direction when the stage is stopped; and
    a stage transfer control unit controlling an operation of the stage according to the stop position direction information stored in said stop position direction storage unit.

8. The apparatus according to claim 7, wherein
    said stage transfer control unit controls the transfer of the stage such that, when the stage is transferred to the position and then stopped, the stage can be stopped in the same direction as the direction indicated by direction information in the stop position direction information.

9. The apparatus according to claim 8, further comprising
    a transfer amount error acquisition unit obtaining an error between an amount of transfer of the transferred stage and an amount of transfer of the stage indicated by control of said stage transfer control unit.

10. The apparatus according to claim 9, wherein
    said stage transfer control unit controls said stage transfer unit based on the transfer amount error obtained from said transfer amount error acquisition unit.

11. The apparatus according to claim 7, further comprising
    a transfer amount error acquisition unit obtaining an error between an amount of transfer of the transferred stage and an amount of transfer of the stage indicated by control of said stage transfer control unit.

12. The apparatus according to claim 11, wherein
    said stage transfer control unit controls said stage transfer unit based on the transfer amount error obtained from said transfer amount error acquisition unit.

13. A control method for a stage of a microscope, comprising the steps of:
    obtaining command information for a transfer of a stage for loading a sample perpendicular to an optical axis of the microscope; and
    controlling transfer of the stage according to stop position direction information which is information obtained according to the command information and information about a position and a direction when the stage is stopped.

14. The method according to claim 13, wherein when the stage is transferred to the position and then stopped, the transfer of the stage is controlled such that the stage can be stopped in the same direction as the direction indicated by direction information in the stop position direction information.

15. The method according to claim 14, further comprising a step of
obtaining an error between an amount of transfer of the transferred stage and an amount of transfer of the stage controlled on transfer of the stage according to the stop position direction information.

16. The method according to claim 15, wherein the transfer of the stage is controlled based on the transfer amount error.

17. The method according to claim 13, further comprising a step of
obtaining an error between an amount of transfer of the transferred stage and an amount of transfer of the stage controlled on transfer of the stage according to the stop position direction information.

18. The method according to claim 17, wherein the transfer of the stage is controlled based on the transfer amount error.

19. A control system of a stage of a microscope, comprising:
stage transfer means for transferring the stage for loading a sample perpendicular to an optical axis of the microscope;
transfer command acquisition means for obtaining command information for a transfer of the stage;
stop position direction storage means for storing stop position direction information which is information generated according to the command information obtained from said transfer command acquisition means, and the information about a position and direction when an operation of said stage transfer means is stopped; and
stage transfer control means for controlling an operation of said stage transfer means according to the stop position direction information stored in said stop position direction storage means.

20. A control apparatus of a stage of a microscope, comprising:
acquisition means for obtaining transfer information which is information for a transfer of the stage of the microscope having a stage for loading a sample perpendicular to an optical axis of the microscope;
stop position direction storage means for storing stop position direction information which is information generated according to the transfer information obtained by said acquisition means when the transfer of the stage is stopped, and the information about the position and direction when the stage is stopped; and
stage transfer control means for controlling an operation of the stage according to the stop position direction information stored in said stop position direction storage means.

* * * * *